(12) United States Patent
Choi

(10) Patent No.: US 8,847,994 B2
(45) Date of Patent: Sep. 30, 2014

(54) METHOD FOR CONTROLLING SCREEN DISPLAY AND DISPLAY DEVICE USING THE SAME

(75) Inventor: Baekwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 13/211,160

(22) Filed: Aug. 16, 2011

(65) Prior Publication Data

US 2012/0139945 A1 Jun. 7, 2012

Related U.S. Application Data

(60) Provisional application No. 61/418,578, filed on Dec. 1, 2010.

(30) Foreign Application Priority Data

Dec. 1, 2010 (KR) ........................ 10-2010-0121233

(51) Int. Cl.
| | |
|---|---|
| G09G 5/00 | (2006.01) |
| G06F 3/0486 | (2013.01) |
| H04N 21/4722 | (2011.01) |
| H04N 21/478 | (2011.01) |
| H04N 21/485 | (2011.01) |
| H04N 21/443 | (2011.01) |
| G06F 3/0483 | (2013.01) |
| G06F 3/0346 | (2013.01) |
| G06F 3/0481 | (2013.01) |
| H04N 5/445 | (2011.01) |
| H04N 21/81 | (2011.01) |

(52) U.S. Cl.
CPC .......... *H04N 5/44543* (2013.01); *G06F 3/0486* (2013.01); *G06F 2203/04806* (2013.01); *H04N 5/44591* (2013.01); *H04N 21/4722* (2013.01); *H04N 21/478* (2013.01); *H04N 21/4858* (2013.01); *H04N 21/4438* (2013.01); *G06F 3/0483* (2013.01); *H04N 21/8193* (2013.01); *H04N 2005/44573* (2013.01); *H04N 21/8173* (2013.01); *G06F 3/0346* (2013.01); *G06F 2203/04803* (2013.01); *G06F 3/04817* (2013.01)
USPC ........................................................ 345/660

(58) Field of Classification Search
None
See application file for complete search history.

(56) References Cited

U.S. PATENT DOCUMENTS

| | | | |
|---|---|---|---|
| 6,983,424 B1 * | 1/2006 | Dutta | 715/800 |
| 2004/0070631 A1 * | 4/2004 | Brown et al. | 345/838 |

(Continued)

FOREIGN PATENT DOCUMENTS

| | | |
|---|---|---|
| EP | 1 511 040 A1 | 3/2005 |
| EP | 1 669 848 A2 | 6/2006 |

(Continued)

OTHER PUBLICATIONS

European Search Report dated Apr. 5, 2012 issued in Application No. 11 00 6556.
European Search Report dated Nov. 23, 2011 issued in Application No. 11 00 6556.

* cited by examiner

*Primary Examiner* — Kee M Tung
*Assistant Examiner* — Frank Chen
(74) *Attorney, Agent, or Firm* — Ked & Associates, LLP

(57) ABSTRACT

Disclosed herein is a method for controlling screen display in a display device. The method includes displaying a first card object including at least one content on a first area of a screen; reducing and displaying a plurality of card objects including the first card object in response to a modification request on the card object displayed on the screen; receiving selection of at least one of the plurality of card objects; and displaying the selected card object on the first area of the screen.

20 Claims, 24 Drawing Sheets

(56) References Cited

U.S. PATENT DOCUMENTS

| | | | |
|---|---|---|---|
| 2005/0149879 A1 | 7/2005 | Jobs et al. | 715/796 |
| 2006/0041846 A1 | 2/2006 | Masselle et al. | 715/793 |
| 2007/0200875 A1* | 8/2007 | Seeger | 345/902 |
| 2007/0226607 A1* | 9/2007 | Sakai | 715/513 |
| 2008/0215978 A1* | 9/2008 | Bamba | 715/713 |
| 2010/0162162 A1 | 6/2010 | Taguchi | 715/791 |
| 2010/0199306 A1* | 8/2010 | Colter et al. | 725/38 |

FOREIGN PATENT DOCUMENTS

| | | |
|---|---|---|
| EP | 2 045 700 A1 | 4/2009 |
| EP | 2 178 283 A1 | 4/2010 |
| EP | 2 199 893 A2 | 6/2010 |
| WO | 2009/143075 A2 | 11/2009 |

METHOD FOR CONTROLLING SCREEN DISPLAY AND DISPLAY DEVICE USING THE SAME

CROSS REFERENCE TO RELATED APPLICATION

The present application claims priority from Korean Patent Application No. 10-2010-0121233, filed Dec. 1, 2010, and claims priority from U.S. Provisional Application No. 61/418,578, filed Dec. 1, 2010, the subject matters of which are incorporated herein by reference.

BACKGROUND OF THE INVENTION

1. Technical Field

The present invention relates to a method for controlling the operations of a display device, and more particularly, a method for controlling a screen displayed on the display device.

2. Description of the Related Art

Recently, digital TV services using wired or wireless communication networks are become more common. The digital TV services can provide various services which have not been provided in existing analog broadcasting services.

For example, an Internet Protocol Television (IPTV) service that is one type of the digital TV services is a bidirectional service which allows a user to actively select the kind, watching time, or the like of a program to be watched. The IPTV service can provide various additional services, such as Internet search, home shopping, on-line games, or the like, based on such a bidirectional characteristic.

SUMMARY OF THE INVENTION

An object of the present invention provides a method for controlling screen display which improves convenience in users and a display device using the method.

According to an aspect of the present invention, there is provided a method for controlling video display including displaying a first card object including at least one content on a first area of a screen; reducing and displaying a plurality of card objects having the first card object in response to a modification request on the card object displayed on the screen; receiving selection of any one of the plurality of card objects; and displaying the selected card object on the first area of the screen.

According to another aspect of the present invention, there is a display device including a display unit for displaying a first card object including at least one content on a first area of a screen; a user interface unit for receiving a modification request on card objects displayed on the screen; and a control unit for performing control such that a plurality of card objects displayable in the display device are scaled down and displayed in response to the modification request and a card object selected among the displayed card objects is displayed on the first area of the screen.

Meanwhile, the method for controlling screen display in the display device may be implemented as a computer-readable recording media recorded with programs for causing a computer to perform the method.

DESCRIPTION OF THE PREFERRED EMBODIMENTS

Methods for controlling screen display according to embodiments of the present invention and display devices using the same are described below with accompanying drawings.

The display device according to embodiments of the present invention which is, for example, an intelligent display device in which a computer supporting function is added to a broadcasting reception function, has an Internet function in addition to the broadcasting reception function, and provides an interface convenient to use by having an input device in which handwriting is possible, a touch screen or a space remote controller. Furthermore, the display device accesses Internet or a computer by supporting a wired or wireless Internet function, thereby performing emailing, web browsing, banking, gaming or the like. In order for the various functions, a standardized universal OS may be used.

Accordingly, the display device described in this specification can add and delete various applications freely onto and from, for example, a universal OS kernel, thereby performing various user-friendly functions. More particular, the display device may be, for example, a network TV, a HBBTV, a smart TV or the like, and may be applicable to a smart phone if required.

Embodiments of the present invention will be described in detail with reference to the accompanying drawings and contents included in the accompanying drawings, but the present invention is not limited or restricted by the embodiments.

Terminology used in the specification of the present invention may adapt common technical terminology that is well-known broadly in consideration of the functions of the present invention and it may be varied according to purpose or practices of people who pertains to the art. In a specific case, the applicant chooses terminology and such terminology is described in the description of the specific embodiments. As a result, the terms may be understood as the meaning based on the content of the description, not as the simple title.

Figure 1:
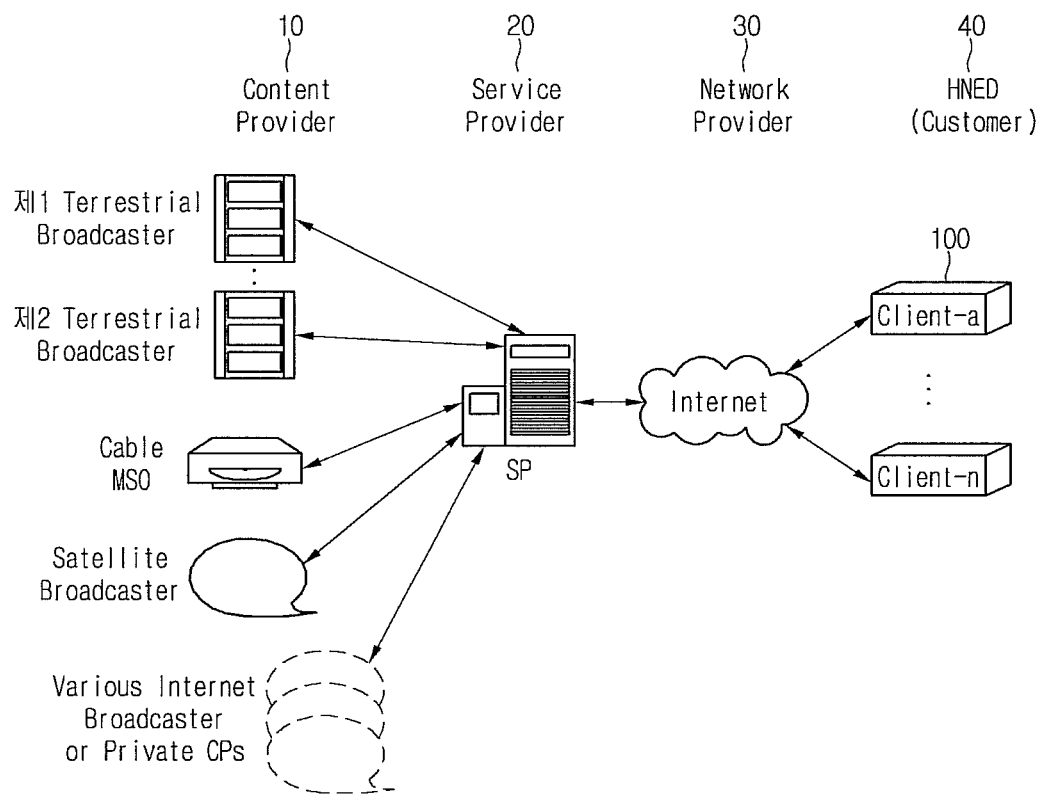
FIG. 1 is a diagram schematically showing an embodiment of the configuration of a broadcasting system.

FIG. 1 shows an embodiment for the configuration of a broadcasting system, which schematically illustrates an example of the entire broadcasting system including a display device according to an embodiment of the present invention.

Referring to FIG. 1, the broadcasting system may include a content provider (CP) 10, a service provider (SP) 20, a network provider (NP) 30 and a HNED 40.

The HNED 40 may correspond to a client 100 that is the display device according to embodiments of the present invention, and the client 100 may be, for example, a network TV, a smart TV, IPTV or the like.

Meanwhile, the content provider 10 produces and provides various types of contents, and may be, as shown in FIG. 1, a terrestrial broadcaster, a cable system operator (SO) or a multiple system operator (MSO), a satellite broadcaster, an Internet broadcaster or the like.

Furthermore, the content provider 10 may provide various applications or the like in addition to broadcasting contents which will be described in detail below.

The service provider 20 service-packages and provides the contents provided by the content provider 10. For example, the service provider 20 may package a first terrestrial broadcasting, a second terrestrial broadcasting, a cable MSO, a satellite broadcasting, various internet broadcastings, applications or the like and provide the packaged broadcastings to a user.

Meanwhile, the service provider 20 provides services with the client 100 using a unicast or multicast method.

In the unicast method, data is transmitted between one transmitter and one receiver in one-to-one correspondence, and, for example, if a receiver requests data from a server in the unicast method, the server transmits the data to the receiver in response to the request.

In the multicast method, data is transmitted to a specific group of multiple receivers. For example, the server transmits the data to a plurality of pre-registered receivers simultaneously. An Internet Group Management Protocol (IGMP) may be used for the multicast registration.

The network provider 30 may provide a network for use in provision of the above-described service to the client 100. The client 100 may built up a Home Network End User (HNED) to receive the service.

As means for protecting the contents transmitted by the above-described system, conditional access, content protection and the like may be used. An example of such conditional access or content protection may be a cable card or DCAS (Downloadable Conditional Access System).

Meanwhile, it is possible for the client 100 to provide contents via a network. In this case, the client 100 may be a content provider and the content provider 10 may receive contents from the client 100. Accordingly, bidirectional content services or data services may be possible.

According to embodiments of the present invention, the content provider 10 may provide network services, such as social network site (SNS), blogs, micro blogs, instant messengers, or the like.

For example, the content provider 10 which provides the SNS service may include a server (not shown) for storing various types of contents, such as texts written or images uploaded by a plurality of users in the social network site.

Specifically, a user accesses the server of the content provider 10 which provides the SNS service using the display device, and designates desired accounts, thereby checking out messages written by the designated multiple accounts.

Further, when the user requests the SNS service, the display device that is the client 100 may access the server of the content provider 10 to receive the messages of the designated accounts and arrange the received messages subsequently in the order the corresponding messages are written out, for example, in a direction from a upper side to a lower side, to display the messages.

Figure 2:
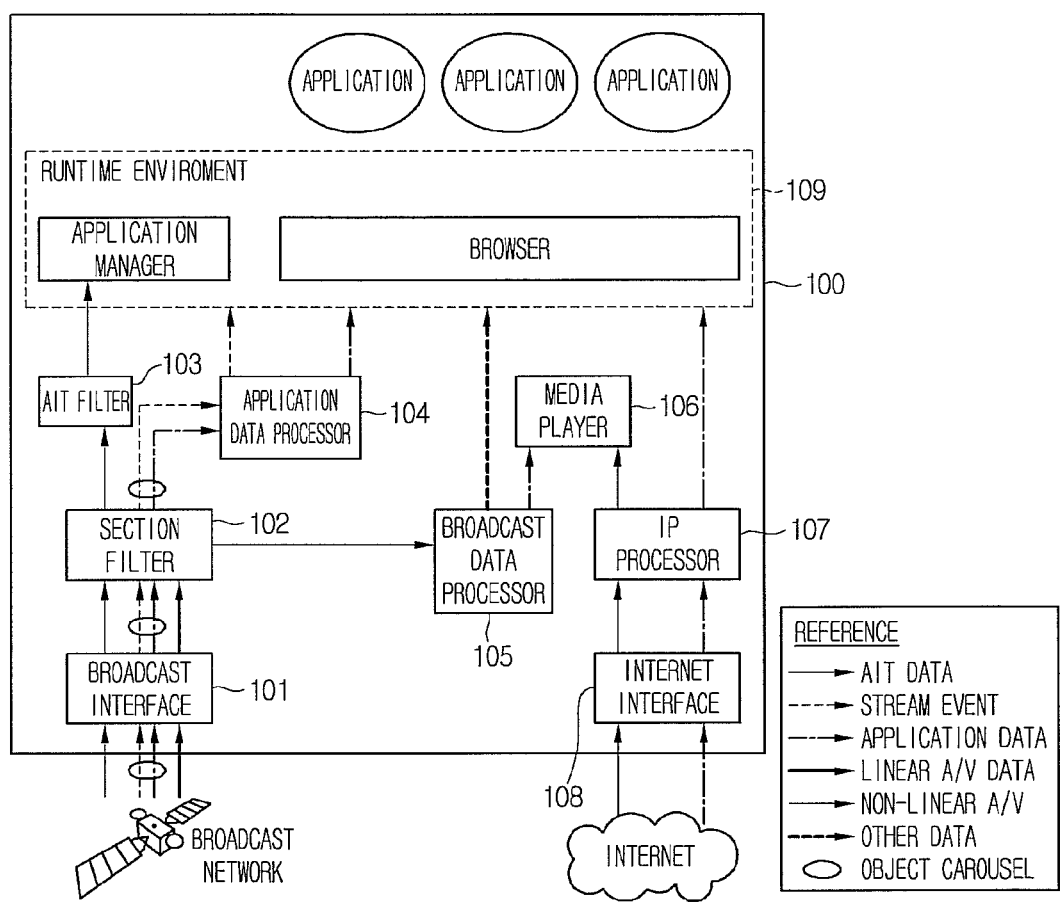
FIG. 2 is a diagram schematically showing another embodiment of the configuration of a broadcasting system.

Referring to FIG. 2, the display device 100 corresponding to the client shown in FIG. 1 may be connected to the broadcasting network and the Internet network.

For example, the display device 100 may include a broadcasting interface 101, a section filter 102, an AIT filter 103, an application data processing unit 104, a broadcasting data processing unit 105, a media player 106, an Internet protocol processing unit 107, an Internet interface 108, and a runtime module 109.

Meanwhile, the broadcasting interface 101 of the display device 100 may receive Application Information Table (AIT) data, real-time broadcasting content, application data, stream events or the like. The real-time broadcasting content may be linear A/V content.

The section filter 102 performs section filtering on four pieces of data received via the broadcasting interface 101 to transmit AIT data to the AIT filter 103, the linear A/V content to the broadcasting data processing unit 105, and the stream events and application data to the application data processing unit 104.

The Internet interface 108 may receive non-linear A/V content and application data. The non-linear A/V content may be Content On Demand (COD) application.

Meanwhile, the non-linear A/V content is transmitted to the media player 106 and the application data may be transmitted to the runtime module 109.

Furthermore, the runtime module 109 may include an application manager and a browser. The application manager may control a life cycle for an interactive application using the AIT data, and the browser may perform a function of displaying and processing the interactive application.

Figure 3:
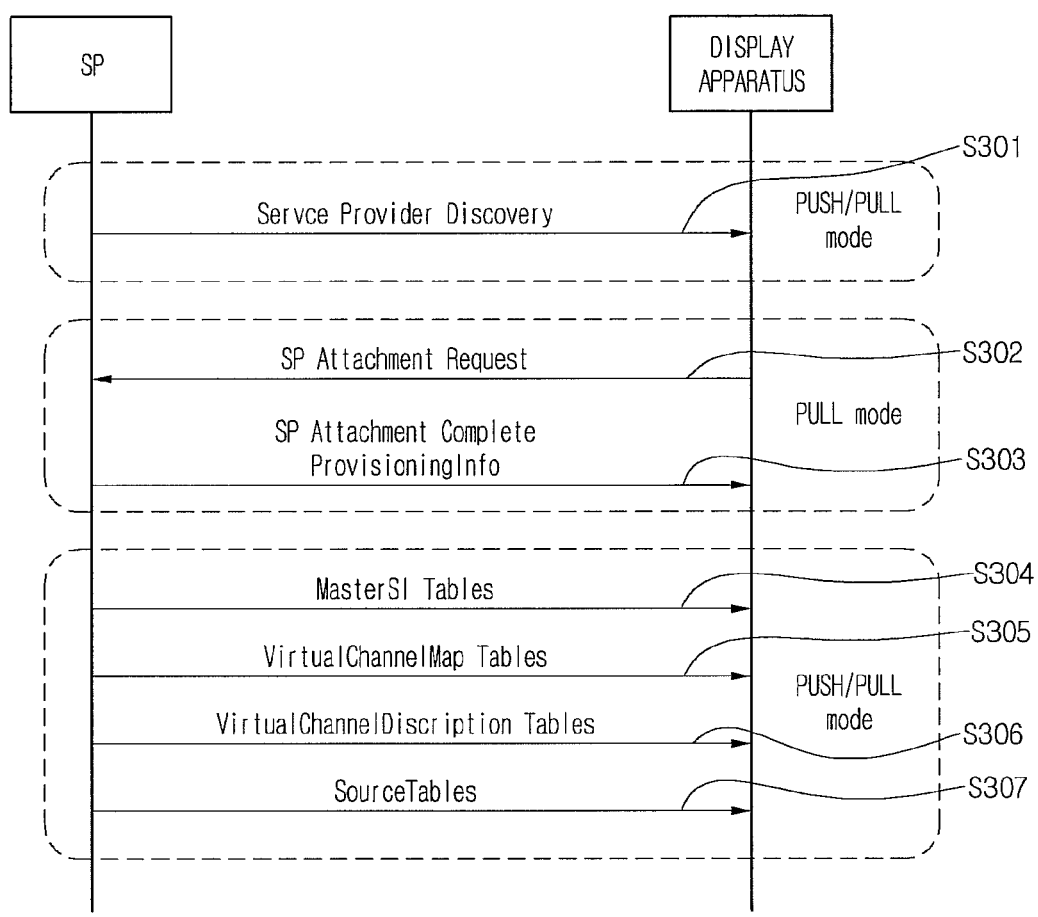
FIG. 3 shows an embodiment of a method for transmitting/receiving data between a display device and a service provider.

FIG. 3 shows an embodiment of a method for transmitting/receiving data between a display device and a service provider.

Referring to FIG. 3, the service provider performs service provider discovery operation (S301). The display device transmits a service provider (SP) attachment request signal (S302). When the SP attachment is completed, the display device receives provisioning information (S303). Furthermore, the display device receives a master SI table (S304), receives a virtual channel map table (S305), receives a virtual channel description table (S306), and receives a source table (S307) from the service provider.

For example, the service provider discovery means a procedure in which service providers for providing services related to IPTV search for servers for providing information about theirs services.

Methods for searching for a list of addresses at which information (for example, SP discovery information) about service discovery servers may be, for example, the following 3 methods. Firstly, addresses previously set by the display device or addresses set through the manual manipulation by a user may be used. Secondly, a DHCP-based SP discovery method may be used. Thirdly, a DNS SRV-based SP discovery method may be used.

Furthermore, the display device accesses a server having an address obtained by any one method of the above-described three methods, and receives a service provider discovery record having information necessary for service discovery for each SP to proceed to a service search step using this record. Meanwhile, the above-described steps may be possible both in a push mode or a pull mode.

On the other hand, the display device may access a SP attachment server designated as the SP attachment locator of a SP discovery record and perform a registration procedure (or service attachment procedure).

Furthermore, the display device may access the authentication service server of a SP to be designated as a SP authentication locator, perform a separate authentication procedure and then perform a service authentication procedure.

After the service attachment procedure has been successful, data transmitted from the server to the display device may have the form of the provisioning information table.

During the service attachment procedure, the display device may add its own ID and location information to data to be transmitted to the server and provide it, and the service attachment server may specify a service joined by the display device based on this data.

The information about an address at which the display device can obtain the service information desired to be received, may be provided in the form of the provisioning information table. Meanwhile, the address information may correspond to the access information of the master SI table, and in this case, it may be easy to provide a customized service for each subscriber.

Furthermore, the service information may include the master SI table record for management of information about access to virtual channel maps and the versions thereof, the virtual channel map table for provision of a packaged service list, the virtual channel description table including detail information about respective channels, the source table including access information for access to real services, and the like.

Figure 4:
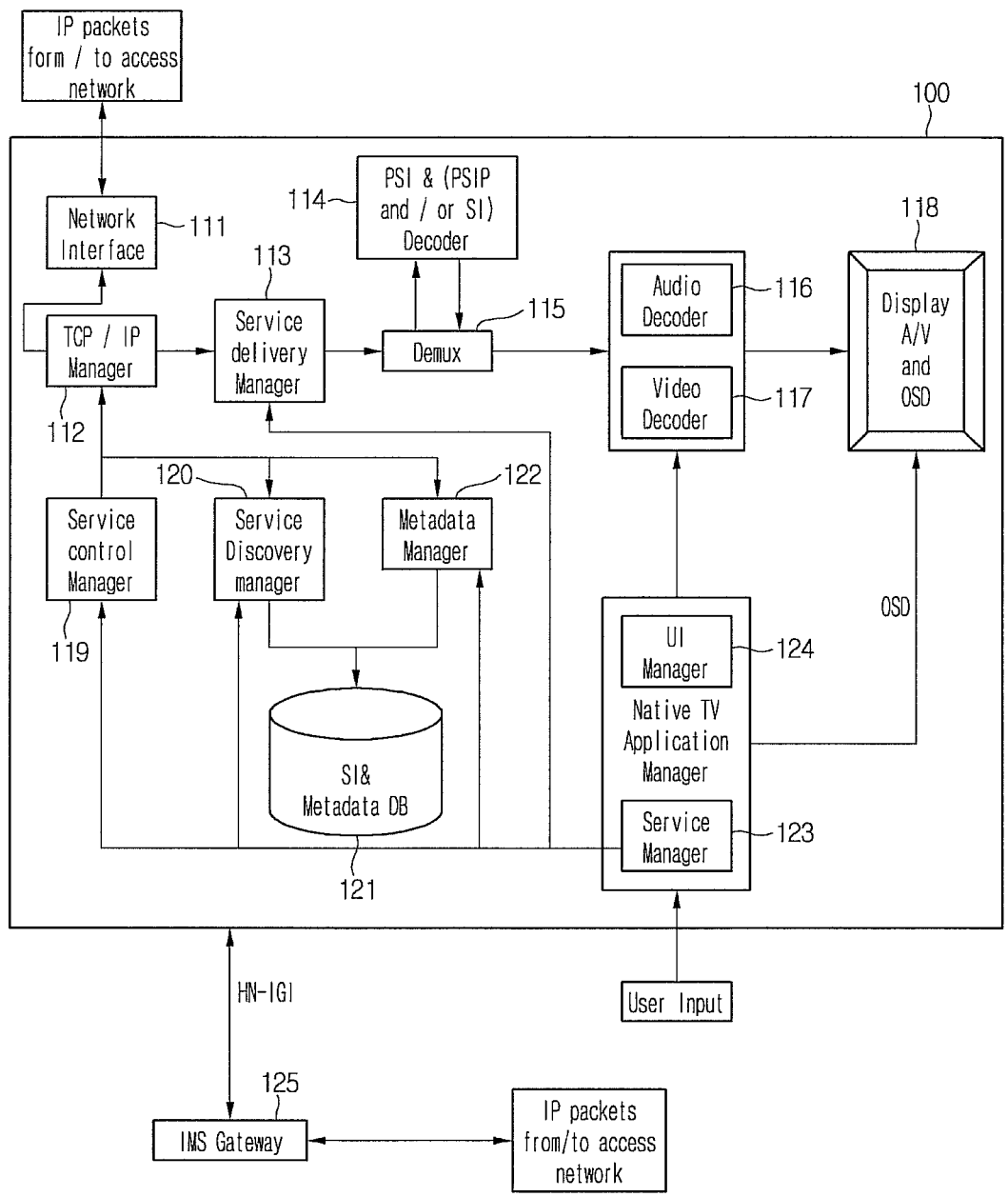
FIG. 4 is a block diagram illustrating a configuration of a display device according to an embodiment of the present invention.

FIG. 4 shows the block diagram of the configuration of a display device according to an embodiment of the present invention.

Referring to FIG. 4, the display device 100 may include a network interface 111, a TCP/IP manager 112, a service delivery manager 113, a de-multiplexer 115, PSI& (PSIP and/or SI) decoder 114, an audio decoder 116, a video decoder 117, a display A/V and OSD module 118, a service control manager 119, a service discovery manager 120, a metadata manager 122, SI & Metadata DB 121, an UI manager 124 and a service manager 123.

The network interface 111 receives packets transmitted from a network and transmits the packets to the network. That is, the network interface 111 can receive services and contents from a service provider through the network.

The TCP/IP manager 112 may be concerned in the delivery of packets from source to destination which are received and transmitted by the display device 100. Furthermore, the TCP/IP manager 112 may classify received packets so as to correspond to appropriate protocols and output the classified packets to the service delivery manager 113, the service discovery manager 120, the service control manager 119 and the metadata manager 122.

Meanwhile, the service delivery manager 113 is in charge of the control of received service data, and may use RTP/RTCP when controlling, for example, real-time streaming data.

When the real-time streaming data is transmitted using the RTP, the service delivery manager 113 may parse the received data packets based on RTP and transmit them to the de-multiplexer 115 or store them in the SI & Metadata DB 121 according to the control of the service manager 123. Furthermore, the service delivery manager 113 may feedback the network reception information to a server for providing a corresponding service using the RTCP.

The de-multiplexer 115 may de-multiplex received packets into audio, video, Program Specific Information (PSI) data, and the like, and transmit them to the audio/video decoders 116 and 117, and the PSI& (PSIP and/or SI) decoder 114 respectively.

The PSI& (PSIP and/or SI) decoder 114 may decode service information, such as program specific information (PSI) or the like, and, for example, may receive and decode a PSI section, a PSIP section or a SI (Service Information) section or the like which are de-multiplexed by the de-multiplexer 115.

Furthermore, the PSI& (PSIP and/or SI) decoder 114 may decode the received sections, organize a database related to service information and store the database related to the service information in the SI & Metadata DB 121.

The audio/video decoders 116 and 117 may decode video data and audio data received from the de-multiplexer 115, and the decoded audio data and video data may be provided to a user through the display A/V and OSD module 118.

Meanwhile, the UI manager 124 and the service manager 123 manage the overall states of the display device 100, provide a user interface and manage other managers.

For example, the UI manager 124 provides a Graphic User Interface (GUI) for the user using On Screen Display (OSD) or the like, and may receive key input from the user to perform the operations of a receiver according to the input. In addition, when the key input related to channel selection is received from the user, the UI manager 124 may transmit the key input signal to the service manager 123.

The service manager 123 may control managers related to services, such as the service delivery manager 113, the service discovery manager 120, the service control manager 119, and the metadata manager 122.

Furthermore, the service manager 123 may create a channel map and select a channel using the channel map according to the key input received from the user interface manager 124.

In addition, the service manager 123 may receive service information related to the channel from the PSI& (PSIP and/or SI) decoder 114 and set the audio/video PIDs (packet identifiers) of the selected channel in the de-multiplexer 115.

The service discovery manager 120 may provide information necessary for selection of a service provider for providing the service. For example, when receiving the signal related to the channel selection from the service manager 123, the service discovery manager 120 can search for the service using the received signal.

Meanwhile, the service control manager 119 is in charge of the selection and control of a service, and may perform the selection and control of the service using IGMP, RTSP or the like when the user selects a live broadcasting service, like existing broadcasting methods and using RTSP when the user selects, for example, a video on demand (VOD) service.

The RTSP protocol can provide a trick mode for real-time streaming and the service control manager 119 can initiate and manage a session via an IMC gateway using IP Multimedia subsystem (IMS) and Session Initiation Protocol (SIP).

The metadata manager 122 manages metadata related to services and stores the metadata in the SI & Metadata DB 711.

Furthermore, the SI & Metadata DB 121 may store service information decoded by the PSI& (PSIP and/or SI) decoder 114, the metadata managed by the metadata manager 122 and information necessary to select a service provider provided by the service discovery manager 120.

In addition, the SI & Metadata DB 121 may store setup data or the like for systems, and, may be implemented using non-volatile RAM (NVRAM) or flash memory or the like.

Meanwhile, the IG 750 may be a gateway in which functions necessary to access IMS-based IPTV services are implemented.

Figure 5:
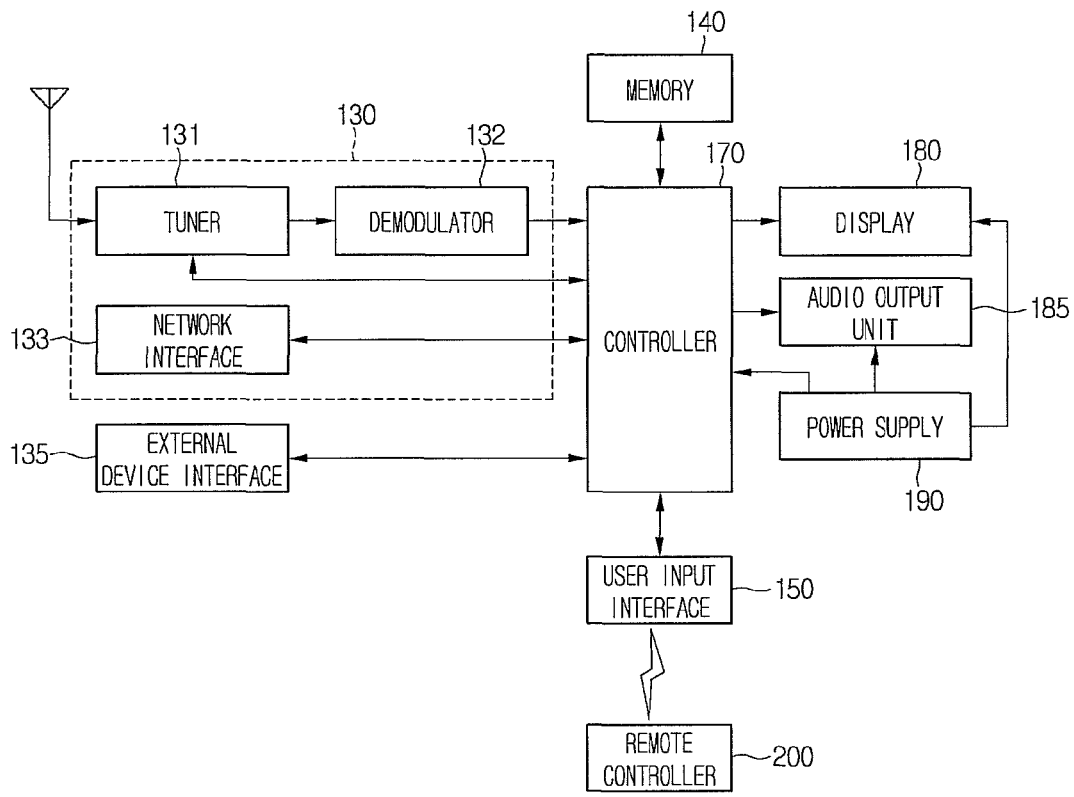
FIG. 5 is a block diagram illustrating a configuration of a display device according to another embodiment of the present invention.

FIG. 5 shows the block diagram of the configuration of a display device according to another embodiment of the present invention.

Referring to FIG. 5, the display device 100 may include a broadcasting reception unit 130, an external device interface unit 135, a storage unit 140, a user input interface unit 150, a control unit 170, a display unit 180, an audio output unit 185 and a power supply unit 190. Meanwhile, the broadcasting reception unit 130 may include a tuner 131, a demodulator 132 and a network interface unit 133.

The tuner 131 selects RF broadcasting signals corresponding to channels selected by a user or pre-stored all channels among RF (Radio Frequency) broadcasting signals received via an antenna and converts the selected RF broadcasting signals into intermediate frequency signals or baseband video or audio signals.

For example, the tuner 131 performs conversion into digital IF signals DIF when the selected RF broadcasting signals are digital broadcasting signals, and performs conversion into analog baseband video or audio signals CVBS/SIF when the selected RF broadcasting signals are analog broadcasting signals.

That is, the tuner 131 can process both digital broadcasting signals and analog broadcasting signals, and the analog baseband video or audio signals CVBS/SIF may be directly input to the control unit 170.

Furthermore, the tuner 131 can receive RF broadcasting signals carried on a single carrier according to an Advanced Television System Committee (ATSC) scheme or RF broadcasting signals carried on a plurality of carriers according to a Digital Video Broadcasting (DVB) scheme.

Meanwhile, the tuner 131 subsequently selects the RF broadcasting signals of all stored broadcasting channels through a channel memory function among RF broadcasting signals received via an antenna and converts them into intermediate frequency signals or baseband video or audio signals.

The demodulation unit 132 may receive the digital IF signals (DIF) converted by the tuner 131 and perform a demodulation operation. For example, when the digital IF signals output from the tuner 131 are based on the ATSC scheme, the demodulation unit 132 can perform 8-Vestigal Side Band (8-VSB) demodulation.

Furthermore, the demodulation unit 132 may perform channel decoding, and, for this, may include a Trellis decoder, a deinterleaver, a reed solomon decoder and the like and perform Trellis decoding, deinterleaving and reed Solomon decoding.

For example, when the digital IF signals output from the tuner 131 are based on the DVB scheme, the demodulation unit 132 can perform COFDMA (Coded Orthogonal Frequency Division Modulation) demodulation.

Furthermore, the demodulation unit 132 may perform channel decoding, and, for this, may include a convolution decoder, a deinterleaver, a reed solomon decoder and the like and perform convolution decoding, deinterleaving and reed Solomon decoding.

The demodulation unit 132 may output stream signals (TS) after the demodulation and channel decoding, and the stream signals may be signals into which video signals, audio signals or data signals are multiplexed.

For example, the stream signals may be MPEG-2 Transport Streams (TS) into which MPEG-2 formatted video signals, Dolby AC-3 formatted audio signals or the like are multiplexed. Specifically, the MPEG-2 TS may include a header of 4 bytes and a payload of 184 bytes.

Meanwhile, the demodulation unit 132 may include the ATSC demodulation unit and the DVB demodulation unit separately according to the ATSC scheme and the DVB scheme.

The stream signals output from the demodulation unit 132 may be input to the control unit 170 and the control unit 170 performs de-multiplexing, video/audio signal processing or the like, and, then outputs the video to the display unit 180 and the audio to the audio output unit 185.

The external interface unit 135 may connect an external device with the display device 100 and for this, may include an A/V input/output unit (not shown), a wireless communication unit (not shown) or the like.

The external device interface unit 153 may be connected to an external device, such as a digital versatile disk (DVD), a blu-ray, a game device, a camera, a camcorder, a computer (notebook) or the like, in wired/wireless methods.

Furthermore, the external device interface unit 135 may deliver video, audio or data signals input from the outside through a connected external device to the control unit 170 of the display device 100 and output the video, audio and data signals processed by the control unit 170 into the connected external device.

The A/V input/output unit may include USB terminals, Composite Video Banking Sync (CVBS) terminals, component terminals, S-video terminals (analog), Digital Visual Interface (DVI) terminals, High Definition Multimedia Interface (HDMI) terminals, RGB terminals, D-SUB terminals or the like so as to input the video and audio signals from the external device to the display device 100.

Meanwhile, the wireless communication unit can perform short distance wireless communication with other electronic devices. For example, the display device 100 may be network-connected to other electronic devices according to communication standards, such as Bluetooth, Radio Frequency Identification (RFID), infrared Data Association (IrDA), Ultra Wideband (UWB), ZigBee, Digital Living Network Alliance (DLNA) or the like.

Furthermore, the external device interface unit 135 may be connected to various set-top boxes via at least one of the above-described terminals and then perform input/output operations with respect to the set-top boxes.

Meanwhile, the external device interface unit 135 receives an application of a neighboring external device or an application list and delivers it to the control unit 170 or the storage unit 140.

The network interface unit 133 my provide an interface for connecting the display device 100 with wired/wireless networks including an Internet network. For example, the network interface unit 133 may include Ethernet terminals or the like for connection with the wired network and be connected to the wireless network using WLAN (Wireless LAN) (Wi-Fi), Wibro (Wireless broadband), Wimax (World Interoperability for Microwave Access) and HSDPA (High Speed Downlink Packet Access) communication standards or the like.

Meanwhile, the network interface unit 133 may transmit and receive data to and from other users or other electronic devices through a network connected thereto or another network linked to the network connected thereto.

Furthermore, the display device 100 may transmit some contents data stored in the display device 100 to a selected user or electronic device of other users that are pre-registered or other electronic devices.

The network interface unit 133 can access a predetermined web page through a network connected thereto, another network linked to the network connected thereto. That is, it is possible to access the predetermined web page through the network and transmit or receive data to and from a corresponding server.

Furthermore, the network interface unit 133 can receive contents or data provided by the content provider or a network operator. That is, the network interface unit 133 can receive contents, such as movies, advertisements, games, VODs, broadcasting signals provided from the content provider or the network provider through the network, and information related thereto.

Furthermore, the network interface unit 133 can receive the updating information and updating files of firmware provided by the network operator and transmit data to Internet, the content provider or the network operator.

The network interface unit 133 can select and receive a desired application among applications opened to public through the network.

The storage unit 140 stores respective programs for signal processing and control in the control unit 170 and may store signal-processed video, audio or data signals.

Furthermore, the storage unit 140 may perform a function of temporally storing video, audio or data signals input from the external device interface unit 135 and the network interface unit 133 and may store information about predetermined broadcasting channels through the channel memory function.

The storage unit 140 may store applications input from the external device interface unit 135 or the network interface unit 133, or the list thereof.

The storage unit 140 may include any one type of storage media of a flash memory type, a hard disk type, a multimedia card micro type, card-typed memory (for example, SD or XD memory, or the like), RAM and ROM (EEPROM etc.).

The display device 100 replays a contents file (a moving picture file, a still image file, a music file, a text file, an application file or the like) stored in the storage unit 140 to provide it to a user.

The user input interface unit 150 may deliver signal input by a user to the control unit 170 or deliver signals from the control unit 170 to the user. For example, the user input interface unit 150 receives and processes control signals, such as power on/off, channel selection, screen settings or the like, from the remote control device 200 according to various communication methods, such as a RF (Radio Frequency) communication method, an Infrared (IR) communication method or the like, or perform a process for transmitting control signals from the control unit 170 to the remote control device 200.

Furthermore, the user input interface unit 150 may deliver a control signal input via a local key (not shown), such as a power supply key, a channel key, a volume key, a setting key or the like, to the control unit 170.

For example, the user input interface unit 150 may deliver a control signal input from a sensor unit (not shown) for sensing the gestures of a user to the control unit 170 and transmit the signal from the control unit 170 to the sensor unit (not shown). Meanwhile, the sensor unit (not shown) may include a touch sensor, a voice sensor, a location sensor, a operation sensor or the like.

The control unit 170 de-multiplexes the streams input from the tuner 131, the de-modulation unit 132 or the external device interface unit 135 or processes the de-multiplexed signals to produce or output signals for video or audio output.

The video signals video-processed by the control unit 170 are input to the display unit 180 so that video corresponding to the corresponding video signals is displayed. Furthermore, the video signals video-processed by the control unit 170 may be input to an external output device through the external device interface unit 135.

The audio signals processed by the control unit 170 may be output to the audio output unit 185 as audio. Furthermore, the audio signals processed by the control unit 170 may be input to the external output device through the external device interface unit 135.

Although not shown in FIG. 5, the control unit 170 may include the de-multiplexing unit, the video processing unit and the like.

In addition, the control unit 170 may control the entire operations of the display device 100. For example, the control unit 170 controls the tuner 131 such it tunes a RF broadcasting corresponding to a channel selected by a user or a pre-stored channel.

Furthermore, the control unit 170 can control the display device 100 by a user instruction input via the user input interface unit 150 or an internal program and access a network to download applications wanted by the user or the list thereof in the display device 100.

For example, the control unit 170 controls the tuner 131 such that the signals of the channel selected according to a predetermined channel selection instruction received via the user input interface unit 150 are inputted, and processes the video, audio and data signals of the selected channel.

The control unit 170 enables information about the channel selected by the user to be output via the display unit 180 or the audio output unit 185 along with the processed video or audio signal.

Furthermore, the control unit 170 enables video signals or audio signals input from an external device, such as a camera or a camcorder, via the external device interface unit 135 according to an external device video replay instruction received via the user input interface unit 150 to be output through the display unit 180 or the audio output unit 185.

Meanwhile, the control unit 170 can control the display unit 180 to display video, for example, perform control such that broadcasting images input through the tuner 131, external input images input through the external device interface unit 135, images input through the network interface unit or images stored in the storage unit 140 are displayed in the display unit 180. In this case, the images displayed in the display unit 180 may be still images or moving images or 2D images or 3D images.

Furthermore, the control unit 170 can perform control such that contents stored in the display device 100, received broadcasting contents, external input contents from the outside are replayed, and the contents may have various formats, such as broadcasting images, external input images, audio files, still images, accessed web screens, text files or the like.

The control unit 170 can perform control such that a home screen is displayed in the display unit 180 according to an input for returning to the home screen.

The home screen may include a plurality of card objects classified for respective content sources. The card objects may include one or more contents, for example, a card object representing the thumbnail list of broadcasting channels, a card object representing a broadcast guide list, a card object representing a broadcasting reservation list or a recording list, a card object representing a media list within the display device or a device connected to the display device and the like. In addition, a card object representing a list of external devices connected thereto, and a card object representing a list related to voice communication or the like may be further displayed on the home screen.

Furthermore, the home screen may further include an application menu having at least one executable application item.

Meanwhile, the control unit 170 performs control such that a corresponding card object is moved and displayed or such that the card object which had not been displayed in the display unit 180 is displayed in the display unit 180 when there is an input for moving the card object.

When a predetermined card object is selected from a plurality of card objects within the home screen, the control unit 170 performs control to display images corresponding to the card object in the display unit 180.

The control unit 170 can perform control to display received broadcasting images and objects representing information related to corresponding broadcasting images within the card object for displaying the broadcasting images. In addition, the broadcasting images can be controlled to fix theirs size by lock settings.

Furthermore, the control unit 170 performs control to display a setup object for any one setting of the video setting, audio setting, screen setting, reservation setting of the display device, the pointer setting of a remote control device, a network setting in the home screen, and may perform control to display objects for Login, Help or Exit items in a part of the home screen.

Meanwhile, the control unit 170 performs control to display the number of all card objects or the number of card objects displayed in the display unit 180 of the all card objects, in a part of the home screen.

When the card object name of a predetermined card object among card objects displayed in the display unit 180 is selected, the control unit 170 performs control to display the corresponding card object over whole screen in the display unit 180.

When a terminating call is received in the external device or the display device, the control unit 170 performs control to focus and display a card object related to a call among the plurality of card objects, or to move to the card object related to a call within the display unit 180 and display it.

Meanwhile, when an item for viewing applications is entered, the control unit 170 can perform control to display applications within the display device 100 or downloadable from an external network or the list thereof.

The control unit 170 can perform control to install and operate the applications downloaded from the external network in conjunction with various user interfaces. Furthermore, it is possible to perform control to display images related to an application executed by the selection of a user in the display unit 180.

Meanwhile, although not shown in FIG. 5, the display device 100 may further include a channel browsing processing unit for generating thumbnail images corresponding to channel signals or external input signals.

The channel browsing processing unit can receive stream signals (TS) output by the de-modulation unit 132 or stream signals output by the external device interface unit 135 and extract images from the input stream signals to generate the thumbnail images.

The generated thumbnail images may be input to the control unit 170 as it is or after having been encoded, or may be encoded in the form of streams and input to the control unit 170.

The control unit 170 can display a thumbnail list having a plurality of thumbnail images using the input thumbnail images in the display unit 180 and the thumbnail images within the thumbnail list may be subsequently or simultaneously updated. Accordingly, the user can see at a single glance the contents of a plurality of broadcasting channels conveniently.

The display unit 180 can convert video signals, data signals and OSD signals processed by the control unit 170 or video signals, data signals and the like received by the external device interface unit 135 into respective R, G, B signals to generate operation signals.

For this, the display unit 180 may use a PDP, a LCD, a OLED, a flexible display, a 3D display or the like, or may be implemented to have a touch screen to be used as an input device in addition to the output device.

The audio output unit 185 can receive signals voice-processed by the control unit 170, such as stereo signals, 3.1 channel signals, or 5.1 channel signals, and output voice related thereto, and, for this, may be implemented using various types of speakers.

Meanwhile, the display device 100 may further include a photographing unit (not shown) for obtaining the image of a user, and the image information obtained by the photographing unit (not shown) may be input to the control unit 170.

In this case, the control unit 170 can detect the gesture of the user based on the image photographed by the photographing unit (not shown) or signals detected by a sensor unit (not shown), or the combination thereof.

The power supply unit 190 can supply power to whole of the display device 100, and, for example, may supply power to the control unit 170 implemented in the form of a System On Chip (SOC), the display unit 180, and the audio output unit 185.

For this, the power supply unit 190 may include a converter (not shown) for converting alternating current power into direct current power and may further include an inverter (not shown) employing a PWM operation for brightness modification and dimming operations when the display unit 180 is implemented using a liquid crystal panel having a plurality of backlight ramps.

The remote control device 200 transmits user inputs to the user input interface unit 150. For this, the remote control device 200 may use Bluetooth, RF (Radio Frequency) communication, IR communication, UWB (Ultra Wideband) or ZigBee methods, or the like.

Furthermore, the remote control device 200 receives video, audio, data signals or the like output by the user input interface unit 150 and displays them in the remote control device 200 or outputs voice or vibrations.

The above-described display device 100 is a fixed type and may be a digital broadcasting receiver capable of receiving at least one of ATSC (8-VSB) compliant digital broadcasting, DVB-T (COFDM) compliant digital broadcasting, ISDB-T (BST-OFDM) compliant digital broadcasting, and the like.

Meanwhile, the display device 100 shown in FIG. 5 is an embodiment of the present invention, so that some of components shown therein may be combined, added or omitted according to the specifications of the display device 100 to be actually implemented.

That is, if required, two or more components may be integrated into one component or one component may be divided into two or more components. Furthermore, functions performed in respective blocks are only for the description of embodiments of the present invention and the detail operations or devices thereof do not limit the claimed scope of the present invention.

According to another embodiment of the present invention, the display device 100 does not include the tuner 131 and the demodulation unit 132 unlike FIG. 5, and may receive images from the network interface unit 133 or the external device interface unit 135 and replay them.

For example, the display device 100 may be divided into a video processing device, such as a set-top box for receiving broadcasting signals or contents according to various network services and a content reproduction device for reproducing contents input from the video processing device.

In this case, a method for providing network services according to embodiments of the present invention which will be described below may be performed by not only the display device 100 as described with reference to FIG. 5 but also any one of the video processing device, such as the separate set-top box or the like, or the content reproduction device having the display unit 180 and the audio output unit 185.

Figure 6:
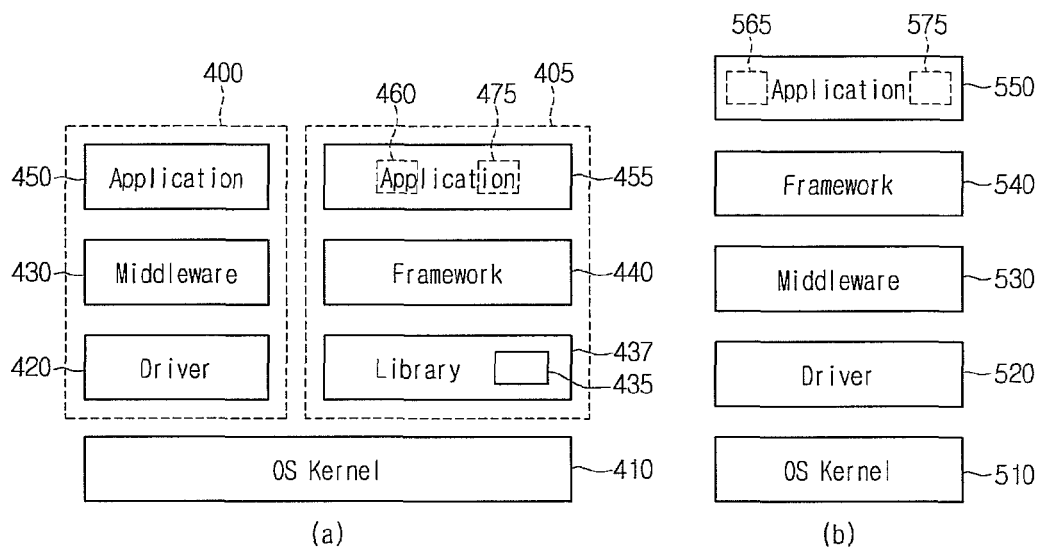
FIG. 6 is a diagram illustrating embodiments of the platform configuration of a display device.

FIG. 6 shows embodiments for the structure of the platform of a display device. The platform of the display device 100 may include OS-based software in order to perform various operations as described above.

Referring to FIG. 6(*a*), the platform of the display device 100 is a separate type platform, and may be designed such that a legacy system platform 400 and a smart system platform 405 are separated from each other.

An OS kernel 410 may be used commonly by the legacy system platform 400 and the smart system platform 405. The legacy system platform 400 may include a driver 420 on the OS kernel 410, middleware 430 and an application layer 450.

Meanwhile, the smart system platform 405 may include a library 435 on the OS kernel 410, a framework 440 and an application layer 455.

The OS kernel 410 is the core of an operating system, and may provide hardware driver operation upon operation of the display device 100, the security of the hardware and processor of the display device, the efficient management of system resources, memory management, the provision of an interface to hardware resulting from hardware abstraction, multi-processors, scheduling management according to multi-processors and power management and the like.

For example, the hardware driver within the OS kernel 410 may include at least one of a display driver, a Wi-Fi driver, a Bluetooth driver, an USB driver, an audio driver, a power manager, a binder driver, a memory driver and the like.

In addition, the hardware driver within the OS kernel 410 is a driver for hardware devices within the OS kernel 410 and may include a character device driver, a block device driver and a network device driver.

Meanwhile, the block device driver includes a buffer for storing a unit size of data as data is transmitted in a specific block unit. The character device driver may not include the above-described buffer as data is transmitted in a basic data unit that is a character unit.

The OS kernel 410 may be implemented as a kernel based on various operation systems (OS), such as Unix (Linux), Windows and the like, and is an open OS kernel which is usable in other electronic devices.

The driver 420 is located between the OS kernel 410 and the middleware 430, and may operate a device for the operation of the application layer 450 in conjunction with the middleware 430.

For example, the driver 420 may include a micom, a display module, a graphic processing unit (GPU), a frame rate conversion (FRC) unit, a General Purpose Input/Output Pin (GPIO), a HDMI, a SDEC (system decoder or demodulation unit), a VDEC (Video Decoder), an ADEC (Audio Decoder), a PVR (Personal Video Recorder), an I2C (Inter-Integrated Circuit) or the like within the display device 100. The above-described drivers can be operated by cooperating with the hardware driver within the OS kernel 410.

Furthermore, the driver 420 may further include a driver for the remote control device, for example, a space remote controller. The driver for a space remote controller may be equipped with the OS kernel 410 or the middleware 430 in addition to the driver 420.

The middleware 430 is located between the OS kernel 410 and the application layer 450 and performs a role of relay so as to transmit and receive data to and from other hardware or software, thereby providing a standardized interface and enabling various environment supports and cooperation with tasks having different systems.

For example, the middleware 430 within the legacy system platform 400 may be middleware for MHEG (Multimedia and Hypermedia information coding Experts Group) that is middleware related to data broadcasting, the middleware of ACAP (Advanced Common Application Platform), the middleware of PSIP or SI that is middleware related to broadcasting information, DLNA middleware that is middleware related to communication with peripherals and the like.

Meanwhile, the application layer 450 on the middleware 430, that is, the application layer 450 within the legacy system platform 400 may include user interface applications related to various menus within the display device 100.

The application layer 450 on the middleware 430 may be edited by the selection of the user, and may be updated through a network. It is possible to enter a desired menu among various user interfaces according to input from the remote control device during viewing of broadcasting images using the application layer 450.

Furthermore, the application layer 450 within the legacy system platform 400 may further include any one of a TV guide application, a Bluetooth application, a reservation application, a digital video recoding application and a hotkey application.

Meanwhile, the library 435 within the smart system platform 405 is located between the OS kernel 410 and the framework 440 and may form the basis of the framework 440. For example, the library 435 may include a SSL (Secure Socket Layer) that is a library related to security, a WebKit that is a library related to a web engine, a libc (c library), a media framework that is a library related to media, such as a video format or an audio format, or the like, and may be written in C or C++ thereby being opened to developers through the framework 440.

The library 435 may include the runtime 437 having a core java library and a virtual machine (VM), and the runtime 437 may form the basics of the framework 440 in conjunction with the library 435.

The virtual machine (VM) may be a virtual machine for enabling the performance of a plurality of instances, that is, multi-tasks. Meanwhile, respective virtual machines (VM) are assigned and performed according to respective applications within the application layer 455. In this case, the binder driver (not shown) within the OS kernel 410 may be operated for scheduling adjustment or interconnection between the plurality of instances.

Meanwhile, the binder driver and the runtime 437 can couple a java-based application to a C-based library and the library 435 and the runtime 437 can correspond to the legacy system middleware.

Meanwhile, the framework 440 within the smart system platform 405 includes programs that are the basics of the applications within the application layer 455. The framework 440 can be compatible with any application and the reuse, movement and exchange of components may be allowed.

The framework 440 may include a supporting program, a program or the like which relates other software components thereto and the like, and for example, may include a resource manager, an activity manager related to the activities of applications, a notification manager a content provider for summarizing information shared between applications and the like.

The application layer 455 on the framework 440 includes various programs which can be executed and displayed in the display device 100, and, for example, may include a core application having at least one of an email, a short message service (SMS), a calendar, a map a browser and the like.

Meanwhile, the framework 440 or the application layer 450 as described above may be created based on Java.

Furthermore, the application layer 455 may be divided into an application 465 which is stored in the display device 100 and can not be deleted by a user, and an application 475 which is downloaded via an external device or a network and stored and can be installed or deleted freely.

Using the applications within the application layer 455, an Internet telephone service based on network connection, a video on demand (VOD) service, a web album service, a social networking service (SNS), a location-based service (LBS), a map service, a web search service, an application search service and the like can be performed. Furthermore, various functions, such as game, or schedule management can be performed.

Meanwhile, as shown in FIG. 6(b), the platform of the display device 100 is a integrated platform which may include the OS kernel 510, the driver 520, the middleware 530, the framework 540 and the application layer 550.

The platform shown in FIG. 6(b) is different from the platform shown in FIG. 6(a) in that the library 435 is omitted and the application layer 550 is included as an integrated layer, and the driver 520 and the framework 540 may be identical to those of the platform shown in FIG. 6(a)

The platforms shown in FIGS. 6(a) and 6(b) may be usable in various electronic devices as well as the display device 100, and may be stored or loaded on the storage unit 140 or the control unit 170 shown in FIG. 5 or a separate processor (not shown).

Alternately, the platforms may be stored or loaded on the SI& metadata DB 711 shown in FIG. 4, the UI manager 714 or the service manager 713, and a separate application processor (not shown) for performance of the applications may be further included.

Figure 7:
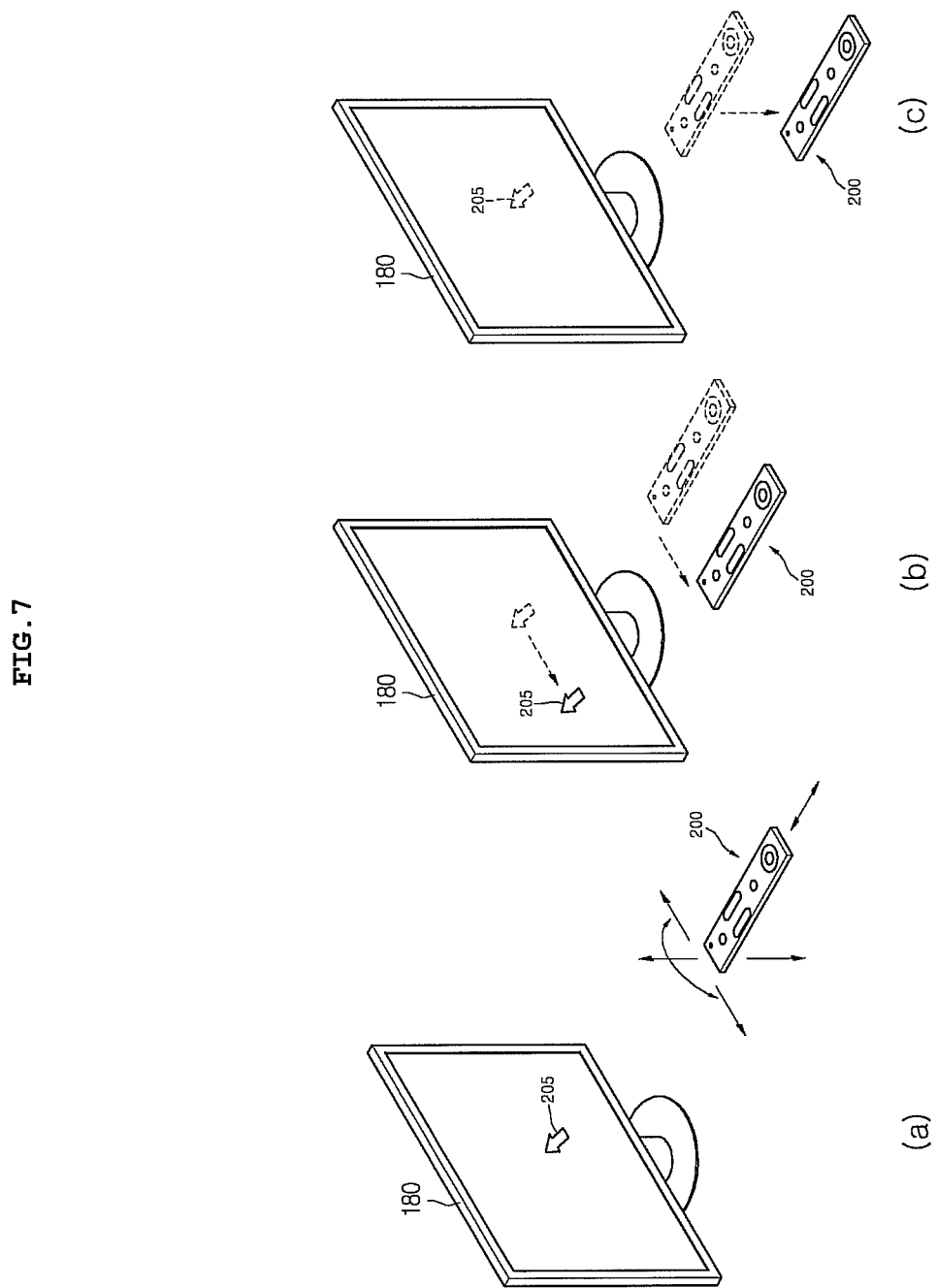
FIG. 7 is a diagram showing an embodiment of a method for controlling the operations of the display device using a remote control device.

FIG. 7 shows an embodiment of a method for controlling the operations of the display device according to embodiments of the present invention using a remote control device.

As shown in FIG. 7(a), a pointer 205 corresponding to the remote control device 200 is exemplarily displayed on the display unit 180.

A user can move and rotate the remote control device 200 up and down, left and right (FIG. 7(b)), or back and forth (FIG. 7(c)). The pointer 205, displayed on the display unit 180 of the display device, responds to the movement of the remote control device 200. The remote control device 200 can be referred to as a space remote controller, since the corresponding pointer 205 is moved and displayed according to the movement thereof in 3D space as shown in the drawing.

FIG. 7(b) shows the case in which when the user moves the remote control device 200 to the left, the pointer 205 displayed in the display unit 180 of the display device is moved to the left in response to this.

Information about movement of the remote control device 200 detected by the sensor of the remote control device 200 is transmitted to the display device. The display device may calculate the coordinates of the pointer 205 based on the information about the movement of the remote control device 200. The display device can display the pointer 205 so as to correspond to the calculated coordinates.

FIG. 7(c) shows the case in which the user moves the remote control device 200 to be far from the display unit 180 while depressing a specific button within the remote control device 200. Due to this, a selected area within the display unit 180 corresponding to the pointer 205 can be zoomed in and enlargedly displayed.

On the contrary, when the user moves the remote control device 200 to be close to the display unit 180, the selected area within the display unit 180 corresponding to the pointer 205 can be zoomed out and displayed to be scaled down in its size.

Meanwhile, when the remote control device 200 is getting far from the display unit 180, the selected area may be zoomed out, and when the remote control device 200 is getting close to the display unit 180, the selected area may be zoomed in.

Furthermore, the recognition of up-down or left-right movement may be excluded during the state in which a specific button within the remote control device 200 is pressed. That is, when the remote control device 200 is moved to be getting far from or closed to the display unit 180, up-down or left-right movement can not be detected and only back-forth movement can be detected. During the state in which the specific button within the remote control device 200 is not pressed, only the pointer 205 is moved according to the up-down or left-right movement of the remote control device 200.

Meanwhile, the movement velocity or direction of the pointer 205 may respond to the movement velocity or direction of the remote control device 200.

Meanwhile, the pointer in this specification means an object displayed on the display unit 180 in response to the movement of the remote control device 200. Accordingly, objects having various shapes are possible for the pointer 205. In addition to an arrow shape displayed on the drawing. For example, a dot, a cursor, a prompt, a wide outline or the like may be conceptually included. Furthermore, the pointer 205 can be displayed not only to correspond to any one point of a horizontal axis and a vertical axis on the display unit 180 but also to correspond to a plurality of points, such as a line, a surface or the like.

Figure 8:
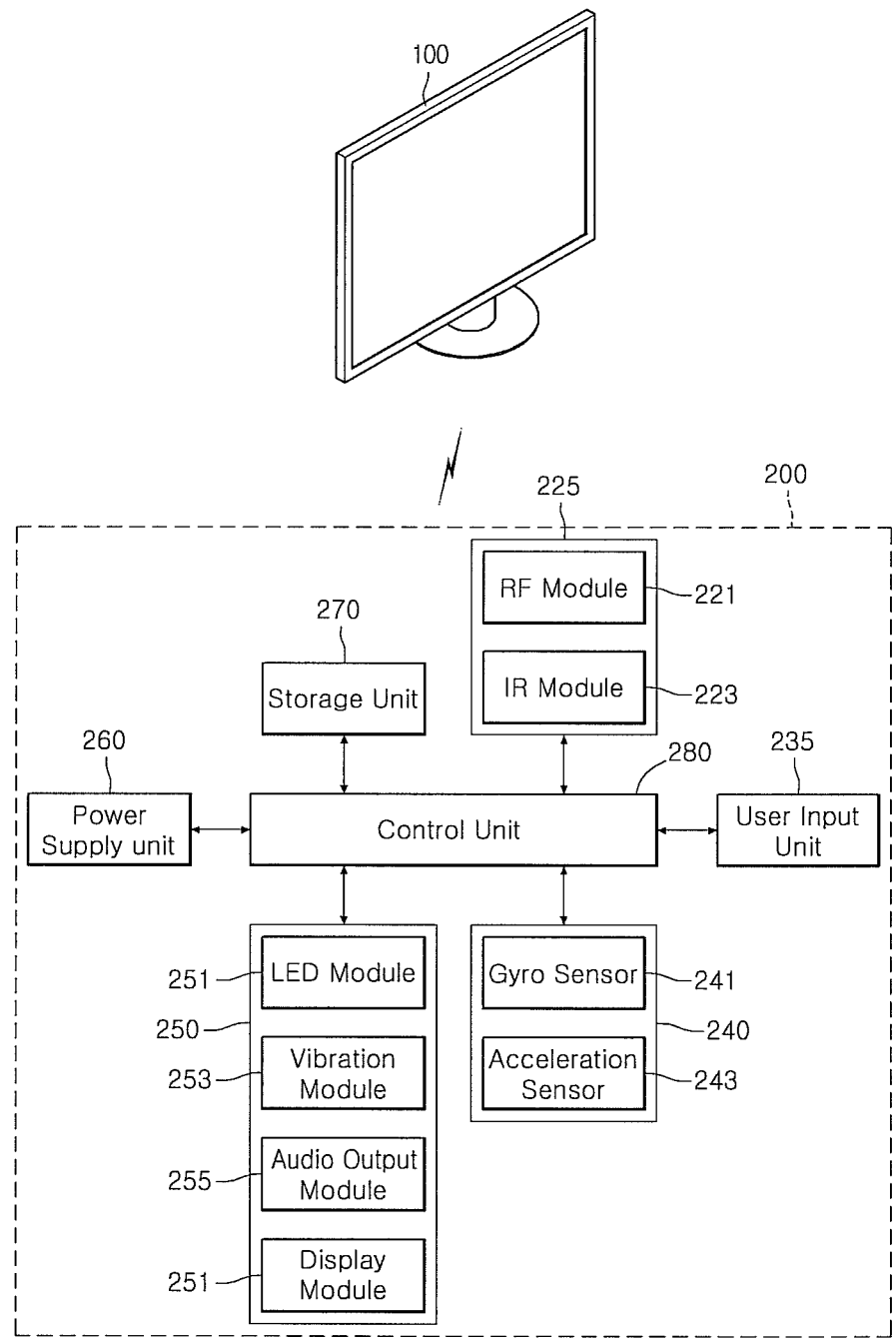
FIG. 8 is a block diagram illustrating an embodiment of the configuration of a remote control device.

FIG. 8 shows the block diagram of an embodiment of the configuration of a remote control device. The remote control device 200 may include a wireless communication unit 225, a user input unit 235, a sensor unit 240, an output unit 150, a power supply unit 260, a storage unit 270 and a control unit 280.

Referring to FIG. 8, the wireless communication unit 225 transmits and receives signals to and from any one of the above-described display devices according to the embodiments of the present invention.

The remote control device 200 includes a RF module 221 for transmitting and receiving signals to and from the display device 100 according to a RF communication standard and may include an IR module 223 for transmitting and receiving signals to and from the display device 100 according to an IR communication standard.

Furthermore, the remote control device 200 transmits signals having information about the movement of the remote control device 200 to the display device 100 via the RF module 221.

Meanwhile, the remote control device 200 can receive the signals transmitted by the display device 100 via the RF module 221, and if required, may transmit an instruction related to power on/off, channel switching, volume modification, or the like to the display device 100 via the IR module 223.

The user input unit 235 may include a keypad, buttons, a touch pad, a touch screen or the like. A user can input an instruction related to the display device 100 to the remote control device 200 by manipulating the user input unit 235. When the user input unit 235 has a hard key button, a user can input an instruction related to the display device 100 to the remote display device 200, by pressing the hard key button.

When the user input unit 235 has a touch screen, a user can input an instruction related to the display device 100 to the remote display device 200, by touching the soft key of the touch screen. Further, the user input unit 235 may have a variety of input means that a user can operate, such as a scroll key or a jog key, and this embodiment does not limit the scope of the present invention.

The sensor unit 240 may include a gyro sensor 241 or an acceleration sensor 243. The gyro sensor 241 may detect information related to the movement of the remote control device 200.

For example, the gyro sensor 241 may detect the information related to the movement of the remote control device 200 based on x, y and z axes and the acceleration sensor 243 may detect information related to the movement velocity of the remote control device 200. Meanwhile, the remote control device 200 may include a distance measurement sensor which detects the distance to the display unit 180 of the display device 100.

The output unit 250 can output video or voice signals corresponding to manipulation of the user input unit 235 or a signal transmitted from the display device 100. A user can recognize whether the user input unit 235 is manipulated or the display device 100 is controlled, through the output unit 250.

For example, the output unit 250 may include an LED module 251 that is turned on/off, a vibration module 253 that vibrates, an audio output module 255 that outputs audio, or a display module 257 that outputs video, when the user input unit 235 is manipulated or signals are transmitted/received to/from the display device 100 via the wireless communication unit 225.

The power supply unit 260 supplies power to the remote control device 200 and can reduce the waste of power by stopping supplying power, when the remote control device 200 does not move for a predetermined time period. The power supply unit 260 can start again to supply power, when a predetermined key included in the remote control device 200 is manipulated.

The storage unit 270 can store various types of programs, application data, or the like required for operating or controlling the remote control device 200. If the remote control device 200 transmits and receives signals to and from the display device 100 via the RF module 221 in a wireless manner, the remote control device 200 and the display device 100 transmits and receives signals between each other at a predetermined frequency band.

The control unit 280 of the remote control device 200 stores information about a frequency band at which it can transmit and receive signals to and from the video displayed device 100 paired with the remote control device 200 in a wireless manner in the storage unit 140 and refers to the information.

The control unit 280 controls the overall matters relating to controlling the remote control device 200. The control unit 280 can transmit a signal corresponding to manipulation of a predetermined key of the user input unit 235 or a signal corresponding to the movement of the remote control device 200 detected by the sensor unit 240, to the display device 100 via the wireless communication unit 225.

Figure 9:
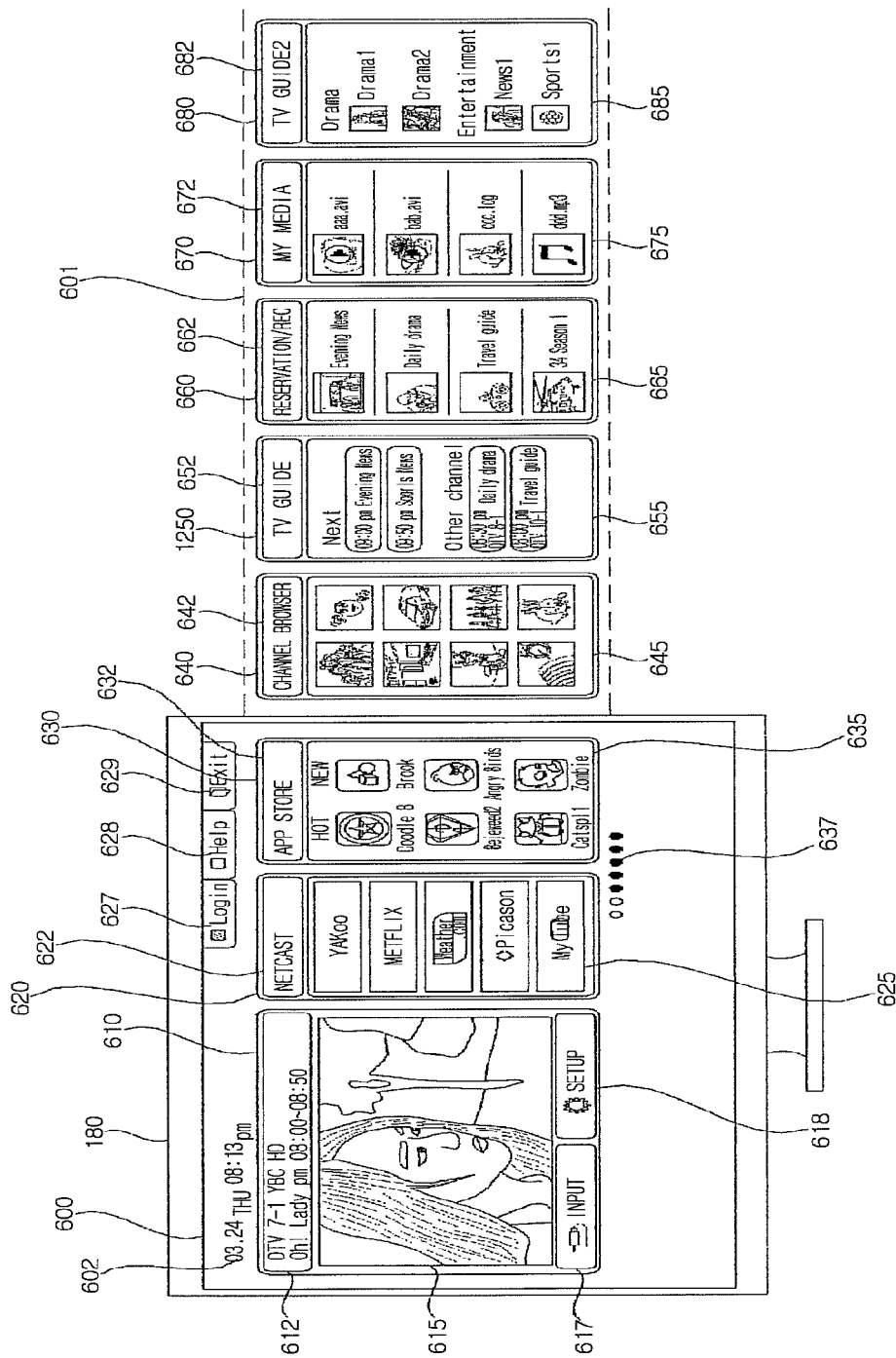
FIG. 9 shows an embodiment of the configuration of a home screen displayed on the display device.

FIG. 9 shows an embodiment of the configuration of a home screen displayed on the display device.

The configuration of the home screen displayed in FIG. 9 may be an example of the basic screen configuration of the above-described display device 100. The screen may be set to be an initial screen when a power supply is turned on or a standby mode is turned on or a basic screen according to the operation of a local key (not shown) or a home key included in the remote control device 200.

Referring to FIG. 9, the home screen 600 may have a card object area, and the card object area may include a plurality of card objects 610, 620 and 630 divided according to the sources of contents.

In the drawing, the card object (BROADCAST) 610 displaying broadcasting images, the card object (NETCAST) 620 representing a list of content providers (CP) and the card object (APP STORE) 630 representing a list of provided applications, which are displayed on the display unit 180, are exemplarily shown.

Meanwhile, the card object (APP STORE) 630 representing the list of provided applications may include information about a plurality of applications downloadable from the service provider 20 and, for example, may include a plurality of icons respectively corresponding to the applications.

Furthermore, in the drawing, as card objects which are not displayed in the display unit 180 and are arranged in a hidden area 601 and upon the movement of the card objects, are exchanged with others and are displayed, a card object (CHANNEL BROWSER) 640 representing a list of thumbnails related to broadcasting channels, a card object (TV GUIDE) 650 representing a list of broadcasting guides, a card object (RESERVATION/REC) 660 representing a list of reserved broadcastings or a list of recorded broadcastings, a card object (MY MEDIA) 670 representing a list of medias within the display device or within a device connected to the display device and a card object (TV GUIDE2) 680 representing a list of broadcasting guides.

The card object (BROADCAST) 610 displaying broadcasting video may include the broadcasting video 615 received via the tuner 110, the network interface unit 130, or the like, an object 612 representing information related to corresponding broadcasting video, an object 617 representing an external device, and a setup object 618.

The broadcasting video 615 is displayed as an card object, and its size may be fixed by a lock function so that a user can watch the broadcasting video continuously.

The size of the broadcasting video 615 can be modified by the manipulation of a user. For example, the size of the corresponding broadcasting video 615 may be enlarged or scaled down by drag using the pointer 205 of the remote control device 200. Due to the enlargement or reduction, the number of card objects displayed on the display unit 180 may be 2 or 4 rather than 3 as shown in the drawing.

Meanwhile, when the broadcasting video 615 within the card object is selected, the corresponding broadcasting video can be enlarged and displayed over the whole screen of the display unit 180.

The object 612 representing information related to the corresponding broadcasting video may include a channel number (DTV7-1), a channel name (YBC HD), a broadcasting program title (Oh! Lady), a broadcasting time (pm 08:00~08:50) and the like. Accordingly, the user can understand information about the displayed broadcasting video 615 intuitively.

Upon the selection of the object 612 representing information related to the corresponding broadcasting video, related EPG information may be displayed on the display unit 180.

Meanwhile, an object representing a date (03.24), a day of the week (THU) and current time (pm 08:13) may be displayed on the card object 610 displaying broadcasting video. Accordingly, a user can understand time information intuitively.

The object 617 representing an external device can represent an external device connected to the display device 100. For example, upon selection of the corresponding object 617, a list of external devices connected to the display device 100 can be displayed.

The setup object 618 may be used to input the various settings of the display device 100. For example, various settings, such as a video settings, an audio setting, a screen setting, a reservation setting, a setting for the pointer of the remote control device 200, a network setting or the like, may be performed.

Meanwhile, the card object 620 representing a list of content providers (CP) may include a card object name (NETCAST) 622 and a content provider list 625. Although Yakoo, Netflix, weather.com, Picason, My tube or the like are shown as the content providers within the content provider list 625, various settings are possible.

When the card object name 622 is selected, the corresponding card object 620 is displayed on the display unit 180 through the entire screen.

Meanwhile, when a predetermined content provider is selected among the content provider list 625, a screen including a list of contents provided by the corresponding content provider may be displayed on the display unit 180.

The card object 630 representing a list of provided applications may include a card object name (APP STORE) 632 and an application list 635. The application list 635 may be a list classified and arranged for each of items within an application store. In the drawing, the arrangement is performed in order of popularity (HOT), newness (NEW) or the like and display is then performed but the present invention is not limited thereto and various examples are possible.

When the card object name 632 is selected, the corresponding card object 630 is displayed on the display unit 180 through the whole screen.

Meanwhile, when a predetermined application item within the application list 635 is selected, a screen providing information about the corresponding application may be displayed on the display unit 180.

A login item 627, a help item 628 and an exit item 629 may be displayed over the card objects 620 and 630.

The login item 627 can be used upon connection to an application store or login into a network to which the display device is connected. The help item 628 can be used for help upon operation of the display device 100. The exit item 629 can be used to attempt to exit a corresponding home screen. In this case, the received broadcasting video may be displayed over the entire screen.

The object 637 representing the number of all card objects may be displayed under the card objects 620 and 630. The object can represent the number of card objects displayed on the display unit 180 among all card objects in addition to the number of all card objects.

Meanwhile, the card object 640 representing a list of thumbnails related to broadcasting channels may include a card object name (CHANNEL BROWSER) 642 and a thumbnail list 645 related to broadcasting channels. In the drawing, the broadcasting channels subsequently received are displayed as thumbnail image, but the present invention is not limited thereto, and moving pictures are possible. The thumbnail list may also include thumbnail images and channel information of corresponding channels. Accordingly, a user can understand the contents of corresponding channels intuitively.

The thumbnail images may be thumbnail images related to preferred channels that are pre-registered by a user, or thumbnail images for channels after or before the broadcasting video 615 within the card object 610. Meanwhile, although 8 thumbnail images are shown in the drawing, various settings are possible. Furthermore, the thumbnail images within the thumbnail list may be updated.

When the card object name 642 is selected, the corresponding card object 640 is displayed on the display unit 180 through the whole screen. That is, contents about the thumbnail list may be displayed on the display unit 180.

Meanwhile, when a predetermined thumbnail image is selected from the thumbnail list 645 related to broadcasting channels, the broadcasting video corresponding to the corresponding thumbnail image can be displayed on the display unit 180.

The card object 650 representing a list of broadcasting guides may include a card object name (TV GUIDE) 652 and a broadcasting guide list 655. The broadcasting guide list 655 may be a list of broadcasting programs following the broadcasting video 615 within the card object 610 or the broadcasting videos of other channels but the present invention is not limited thereto, and various examples are possible.

When the card object name 652 is selected, the corresponding card object 650 is displayed on the display unit 180 through the whole screen.

Meanwhile, when a predetermined broadcasting item is selected from the broadcasting guide list 655, the broadcasting video corresponding to the corresponding broadcasting item can be displayed on the display unit 180 or broadcasting information corresponding to the broadcasting item can be displayed.

The card object 660 representing a list of reserved broadcastings or recorded broadcastings may include a card object name (RESERVATION/REC) 662 and a broadcasting reservation list or a recoding list 665. The broadcasting reservation list or the recoding list 665 may be a list having broadcasting items previously reserved to be recorded by a user or recorded broadcasting items. Although the thumbnail images are shown to be provided for respective corresponding items, various examples are possible.

When the card object name 662 is selected, the corresponding card object 660 is displayed on the display unit 180 through the whole screen.

Meanwhile, a broadcasting item previously reserved to be recorded or a recorded broadcasting item is selected from the broadcasting reservation list or the recoding list 665, the broadcasting information related to the corresponding broadcasting or the recorded broadcasting video can be displayed on the display unit 180.

The card object 670 representing a list of media may include a card object name (My MEDIA) 672 and a media list 675. The media list 675 may be a list of media within the display device 100 or a device connected to the display device 100. Although moving images, still images, audio and the like are exemplarily shown, various examples, such as text documents, e-book documents or the like, are possible.

When the card object name 672 is selected, the corresponding card object 670 is displayed on the display unit 180 through the whole screen.

Meanwhile, when a predetermined media item within the media list 675 is selected, the corresponding media can be performed and a screen corresponding to the corresponding media may be displayed on the display unit 180.

The card object (TV GUIDE2) 680 representing a list of broadcasting guides may include a card object name (TV GUIDE2) 682 and a broadcasting guide list 685. The broadcasting guide list 685 may be a list of guides for respective broadcasting types. Although lists for broadcasting genres resulting from classification according to entertainments, such as drama, news, or sports, are exemplarily shown, various settings are possible. That is, the lists may be broadcasting guide lists for genres, such as drama, movie, news, sports, animation and the like. Accordingly, the user can see the guide lists classified for genres during broadcasting.

When the card object name 682 is selected, the corresponding card object 680 is displayed on the display unit 180 through the whole screen.

Meanwhile, when a predetermined broadcasting item within the broadcasting guide list 685 is selected, a screen corresponding to the broadcasting video may be displayed on the display unit 180.

The card objects 620 and 830 displayed on the display unit 180 and the card objects 640, 650, 660, 670 and 680 not displayed on the display unit 180 and located in the hidden area 601 may be exchanged with each other by an input for movement of the card objects.

That is, at lease one of the card objects 620 and 630 displayed on the display unit 180 may be moved to the hidden area 601, and at least one of the card objects 640, 650, 660, 670 and 680 located in the hidden area 601 may be displayed on the display unit 180.

Meanwhile, the home screen 600 of the display device 100 may further include a card object representing information related to software upgrading.

According to an embodiment of the present invention, when the user wants to change card objects displayed on the screen as described above, it is possible to scale down and display all of a plurality of card objects by the display device 100 on the screen.

Therefore, the user can see at a single glance the selectable card objects on one screen, thereby easily selecting a desired card object.

Figure 10:
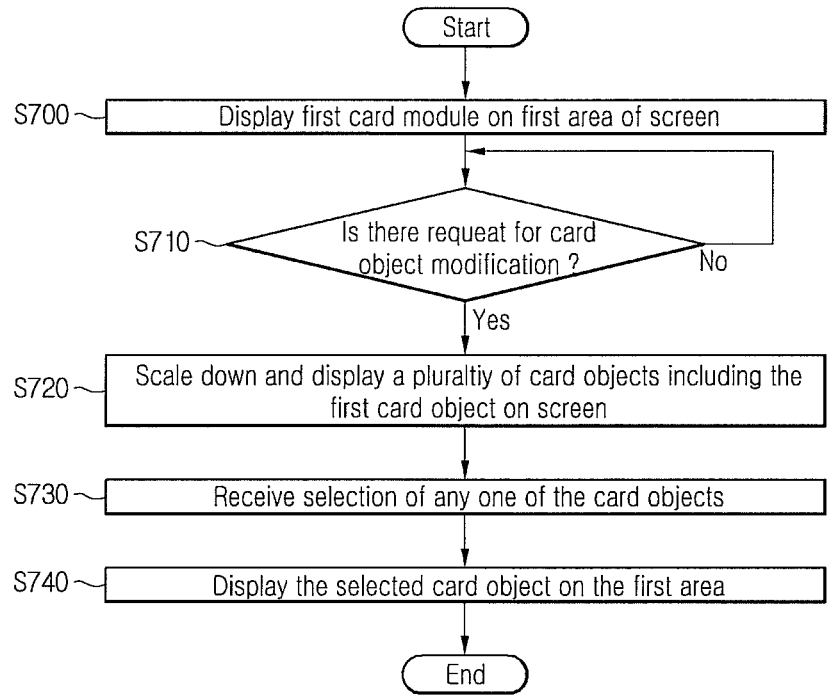
FIG. 10 is a flow chart showing a method for controlling screen display in a display device according to an embodiment of the present invention.

FIG. 10 shows a flowchart illustrating a method for controlling screen display in the display device according to the embodiments of the present invention. The shown control method is described with reference to the block diagram illustrating the configuration of the display device shown in FIG. 5.

Referring to FIG. 10, the display unit 180 of the display device 100 displays a first card object including at least one contents on a first area of the screen under the control of the control unit 170 (step S700).

Figure 11:
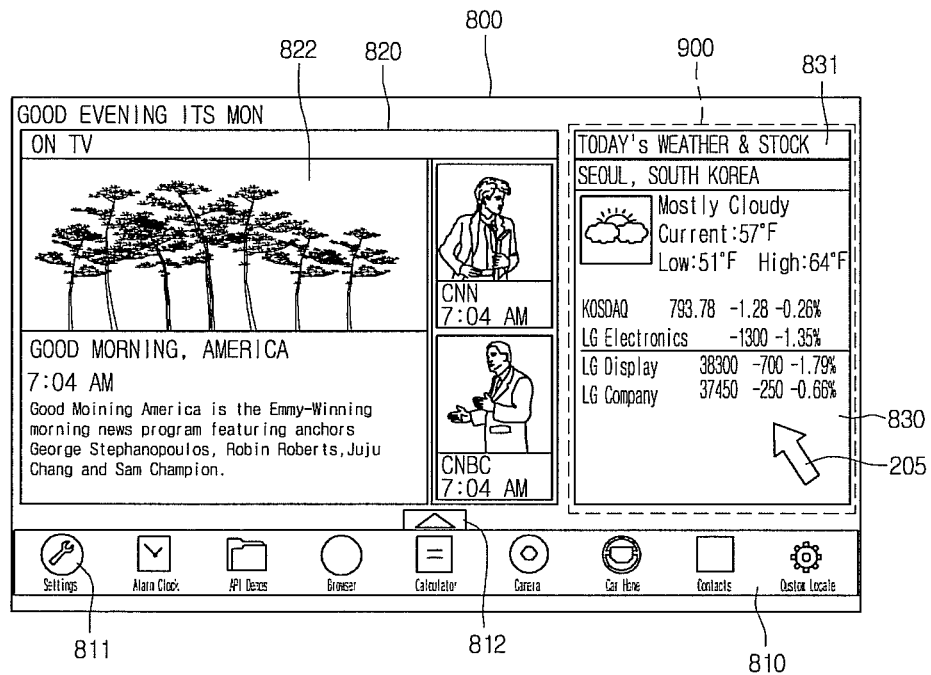
FIGS. 11 to 15 are diagrams showing a first embodiment of a method for displaying a plurality of card objects selectable in the display device on a screen.

Referring to FIG. 11, the display unit 180 can display an application menu 810 that is the object representing application items installed in the display device 100 on the screen 800, and the application menu 810 may be displayed on the lower end of the screen 800.

For example, the application menu 810 is downloaded using object "APPL STORE" 630 shown in FIG. 9 and may include icons 811 respectively corresponding to a plurality of applications executable in the display device 100.

Meanwhile, the application menu 810 may be an application brief look menu. In this case, some of the plurality of applications executable in the display device 100 may be displayed.

Furthermore, the application items displayed on the application menu 810 may be edited to display applications frequently used through the settings of a user.

The display unit 180 can display one or more objects for displaying at least one of broadcasting video, a content provider list, a buyable application list, a broadcasting channel list, a broadcasting guide list, a broadcasting reservation/recording list, a media list, an external device list, a voice communication related list, and a list of contents provided by a specific content provider, along with the application menu 810 on the screen 800.

For example, the display unit 180 may display a broadcasting video display window 820 which is an object for displaying broadcasting video along with the application menu 810, and the broadcasting video display window 820 may include the broadcasting video 822 received via the tuner 110 and the network interface unit 135.

Meanwhile, the display unit 180 can display various objects in addition to the application menu 810 and the broadcasting video display window 820 on the screen 800, and for example, may display a weather & stock information window 830 which is an object representing today's weather and stocks as shown in FIG. 11.

An enlargement button 812 for enlarging the application menu 810 may be displayed within the application menu 810 or adjacent thereto.

The user can move the pointer 205 displayed on the screen 800 using the remote control device 200 and select the enlargement button 812 of the application menu 810 as described with reference to FIG. 7, thereby requesting overall screen enlargement display for the application menu 810.

Furthermore, the user can select the weather & stock information display window 830 by locating the pointer 205 using the remote control device 200 and drag the weather & stock information display window 830 in a specific direction by moving the pointer 205 when the weather & stock information display window 830 has been selected.

According to an embodiment of the present invention, the first card object displayed in the screen at step S700 may be the weather & stock information display window 830 on which the pointer 205 is located, and the first area 900 may be an area on which the weather & stock information display window 830 is displayed.

The control unit 170 determines whether a modification request for the displayed card object is generated by the user (step S710).

As shown in FIG. 11, the user locates the pointer 205 in the weather & stock information display window 830 which is the first card object to perform selection, and therefore requests modification of the first card object displayed on the screen 800 into another card object.

For example, when the user locates the point 205 in the upper end area 831 of the weather & stock information display window 830 on which a corresponding object name is displayed, and then presses the selection button of the remote control device 200, the control unit 170 can determine that the card object modification request is generated to display another cared object on the area on which the weather & stock information display window 830 is displayed.

In response to the card object modification request, the control unit 170 controls the display unit 180 such that the plurality of card objects including the first card object are scaled down and displayed on the screen (step S720).

For example, when the user locates the pointer 205 on the weather & stock information display window 830 displayed on the screen 800 and clicks it, the display unit 180 can display all card objects selectable in the display device 100 on the screen 800 all together.

Figure 12:
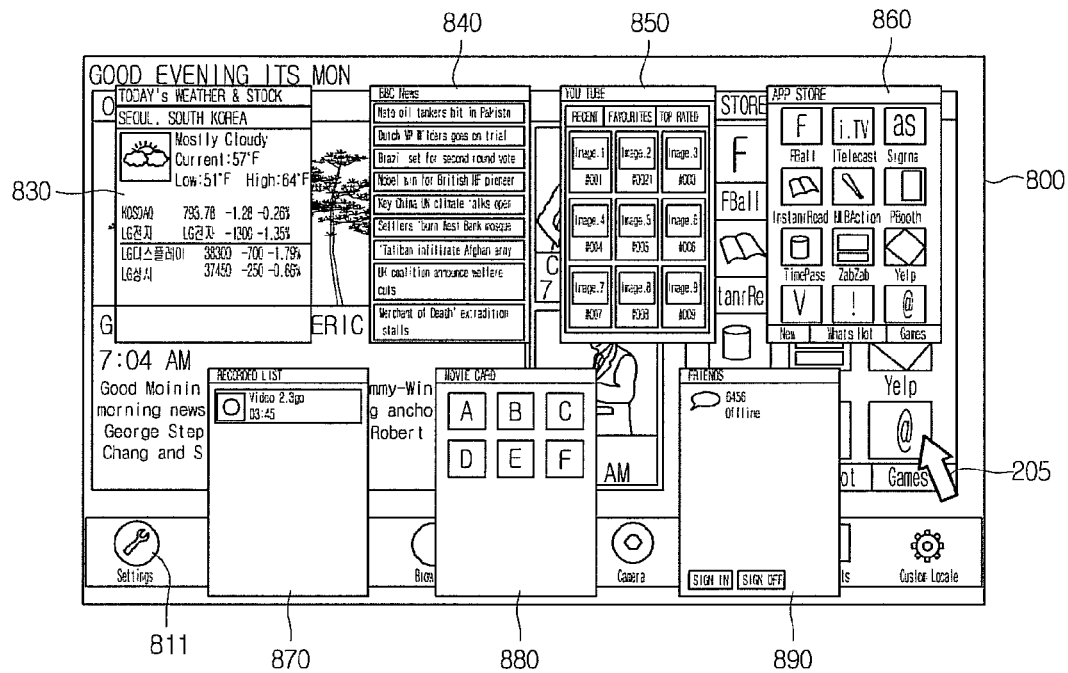

Referring to FIG. 12, in response to the card object modification request, the display unit 180 scales down all card objects 830 to 890 selectable in the display device 100 and displays them on one serene.

Figure 13:
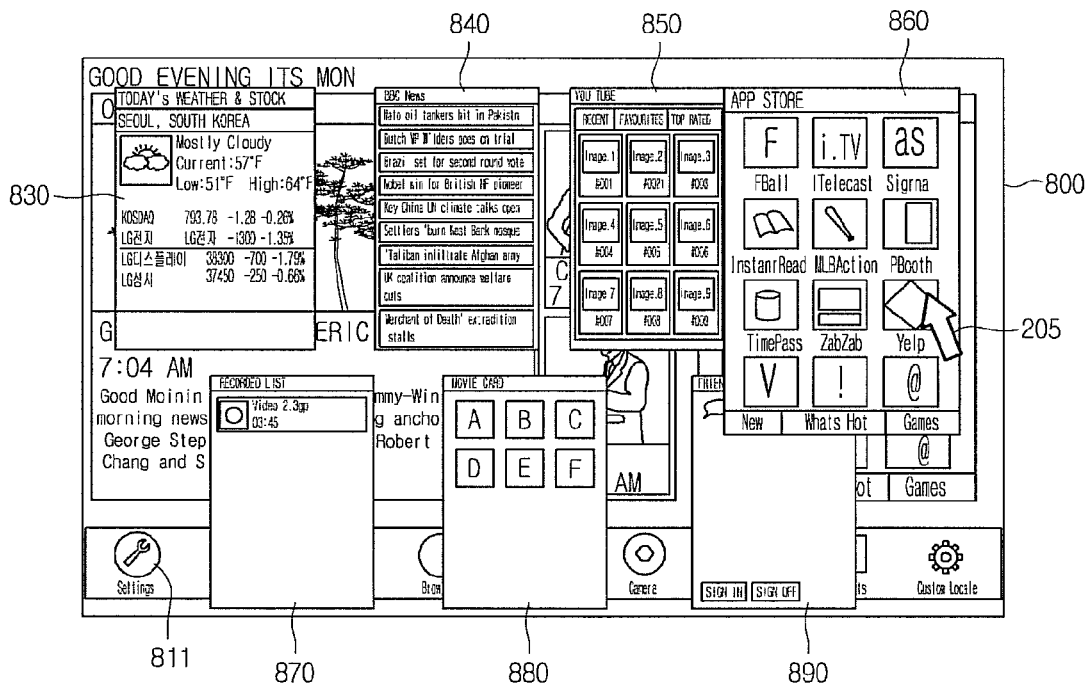

Meanwhile, as shown in FIG. 13, when the user locates the pointer 205 in the "APP STORE" object 860 representing any one of the plurality of card objects 830 to 890 displayed on the screen 800, for example, the application provision list, the "APP STORE" object 860 on which the pointer 205 is located is enlarged in a size larger than those of other objects and displayed on the screen 800.

Thereafter, the user interface unit 150 receives selection of any one among the plurality of card objects displayed on the screen from the user (step S730) and the control unit 170 controls the display unit 180 such that the selected card object is displayed on the first area on which the first card object has been displayed (step S740).

Figure 14:
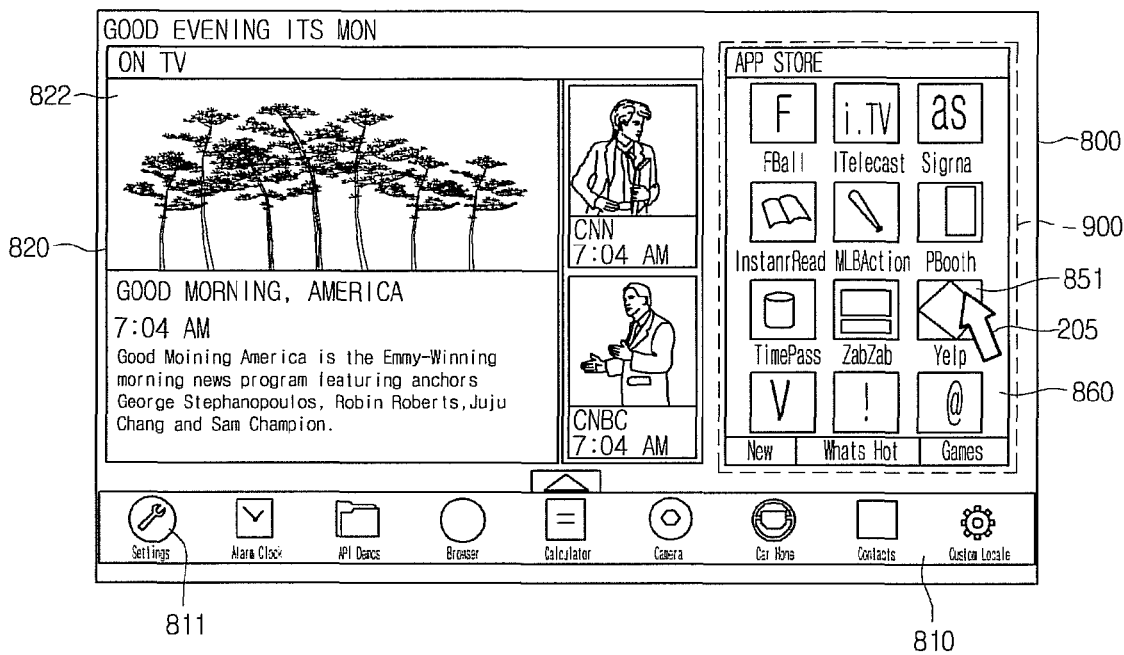

Referring to FIG. 14, when the user selects the "APP STORE" object 860 on the screen 800 shown in FIG. 13, the selected "APP STORE" object 860 is exchanged therewith and then displayed on the first area 900 on which the weather & stock information display window 830 has been displayed.

For example, the user locates the pointer 205 on any one of the plurality of card objects 830 to 890 displayed on the screen 800 and then press the selection button included in the remote control device 200, so that the corresponding card object is displayed on the area on which the weather & stock information display window 830 had been displayed.

The "APP STORE" object 860 may display the icons 861 respectively corresponding to a plurality of applications downloadable from the service provider 20.

Meanwhile, the user can select a desired application among the plurality of applications included in the "APP STORE" object 860 using the pointer 205, and therefore, the selected application can be downloaded from the display device 100 and installed.

According to another embodiment of the present invention, the user can change the card object displayed on the screen 800 with another object by selecting a specific button displayed in the screen 800 of the display device 100 or a specific button included in the remote control device 200.

Figure 15:
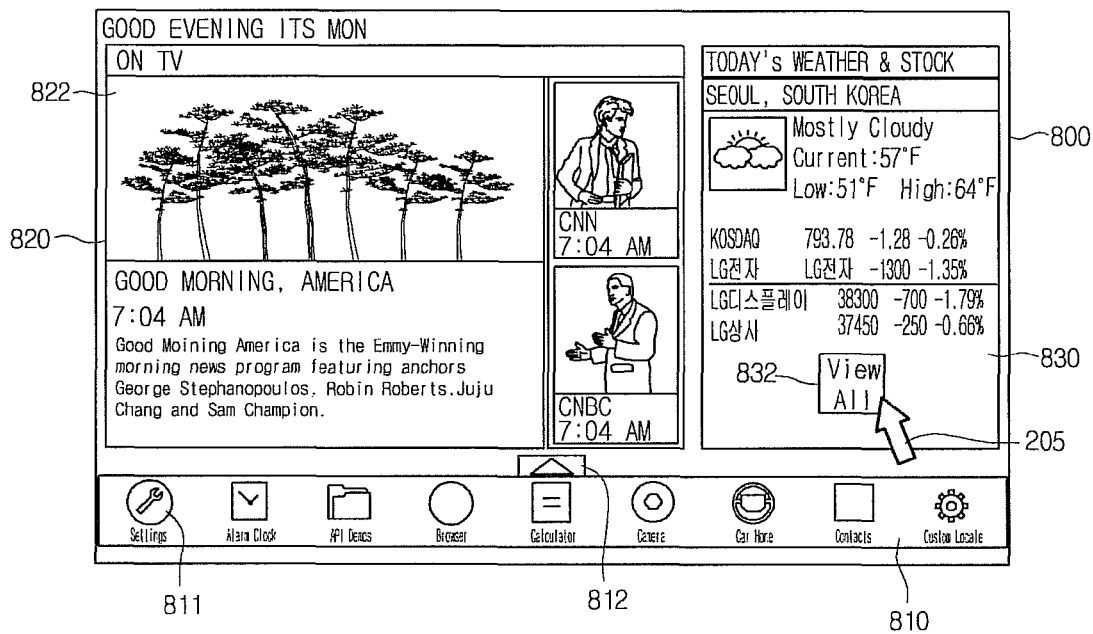

Referring to FIG. 15, "View all" button 832 for displaying all card objects selectable in the display device 100 can be displayed on the screen 800.

For example, when the user selects "View all" button 832 displayed on the weather & stock information display window 830, as shown in FIG. 12, all card objects 830 to 890 selectable in the display device 100 can be scaled down and displayed on the screen 800 together.

Another embodiment of a method for displaying a plurality of card objects selectable in the display device on a screen is described below with reference to FIGS. 16 to 21.

According to another embodiment of the present invention, the user can exchange a card object displayed on the screen with a desired card object by dragging the card object displayed on the screen in a specific direction.

The dragging is a gesture made by a user using specific input means in graphic user interface (GUI) environment, and is a user interface method based on one behavior of selecting a specific object using the input means and moving it into a specific location.

For example, the dragging means moving the object into the specific location by moving the input means in the state in which the specific button included in the input means has been pressed. More particular, the dragging operation is performed by selecting the object located in a part of the screen using the input means and placing it in another location of the screen by dragging it.

According to an embodiment of the present invention, the user enables the plurality of card objects selectable in the display device 100 to be displayed on the screen by dragging the card object displayed on the screen using the included input means in the specific direction.

Meanwhile, the input means for performance of the dragging operation may be the remote control device 200 connected to the display device 100 in a wired or wireless manner, or a device for detecting the movement of a part of the user's body, such as fingers, eyes, or the like.

For example, the remote control device 200 may be input means, such as a space remote controller or a mouse, for detecting the behavior of the user and transmits signals corresponding to the behavior to the display device 100.

Furthermore, the display device 100 may include a touch panel capable of detecting a location touched by a specific object or the movement of the touched object. Accordingly, the user can perform the dragging operation as described above by touching a screen using its own finger or the specific object.

Meanwhile, the display device 100 may include a sensor unit for detecting the movement of the user's eyes, and therefore, receive the dragging operation as described above according to the movement of the user's eyes.

According to embodiment of the present invention, when the first card object displayed on the screen 800 is dragged in a first direction, other objects selectable in the display device 100 can be displayed to be adjacent to the first card object in a direction opposite to the first direction.

Figure 16:
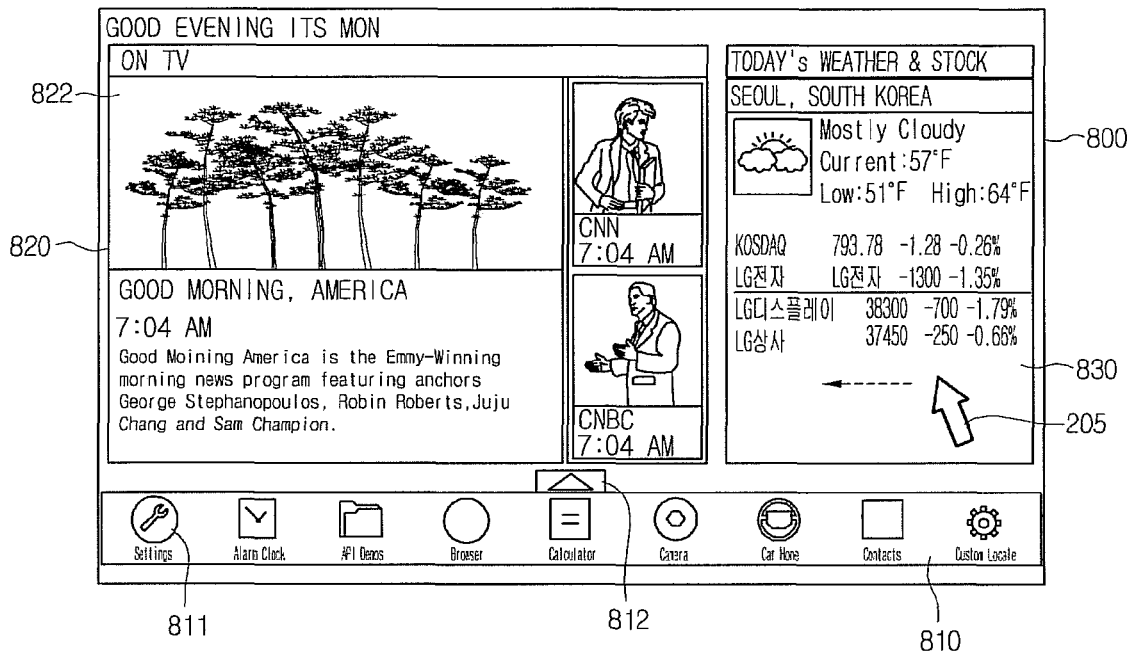
FIGS. 16 to 21 are diagrams showing a second embodiment of a method for displaying a plurality of card objects selectable in the display device on a screen.

Referring to FIG. 16, when the user drags the weather & stock information display window 830 in a left direction, the card objects displayed on the screen 800 may be modified.

Figure 17:
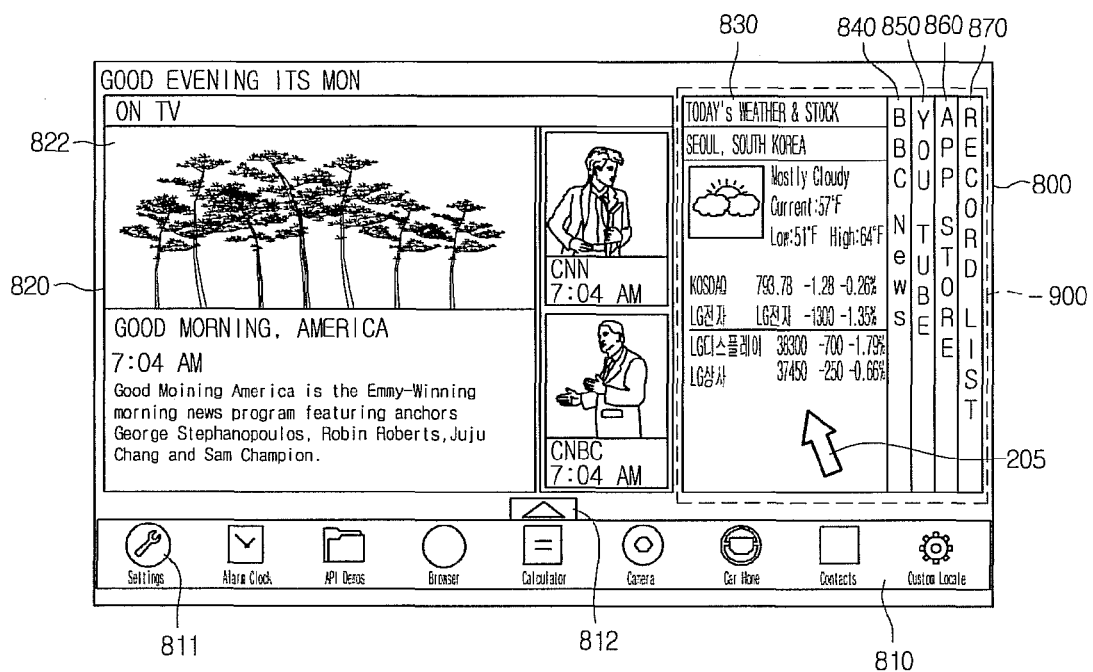

For example, when the user drags the weather & stock information display window 830 in a left direction, other card objects 840 to 870 selectable in the display device 100 may be displayed to be adjacent to the weather & stock information display window 830 in a right direction as shown in FIG. 17.

Meanwhile, the dragged weather & stock information display window 830 and the other card objects 840 to 870 may be displayed together on the first area 900 on which the weather & stock information display window 830 has been displayed prior to the dragging operation, so that it can be prevented that the broadcasting video 822 that being watched by a user is covered by the card objects.

For this, the weather & stock information display window 830 may be gradually scaled down in its size to be displayed as it is dragged, and the other card objects 840 to 870 may be displayed on an area resulting from the reduction of the weather & stock information display window 830 among the first area 900 of the screen 800.

Furthermore, as the weather & stock information display window 830 is scaled down and displayed, the amount of information included in the weather & stock information display window 830 displayed on the screen 800 may be reduced; for example, some of displayed items included in the weather & stock information display window 830 may be not displayed.

Meanwhile, as shown in FIG. 17, the card object names of the card objects 840 to 870 displayed to be adjacent to the dragged weather & stock information display window 830 in a right direction are only displayed on the screen 800.

According to an embodiment of the present invention, the number of other card objects displayed on the screen 800 may be altered according to the distance or velocity at which the card object is dragged, or the like.

For example, as the distance or velocity, at which the card object is dragged, increases, the number of other card objects displayed to be adjacent to the card object may increase.

Figure 18:
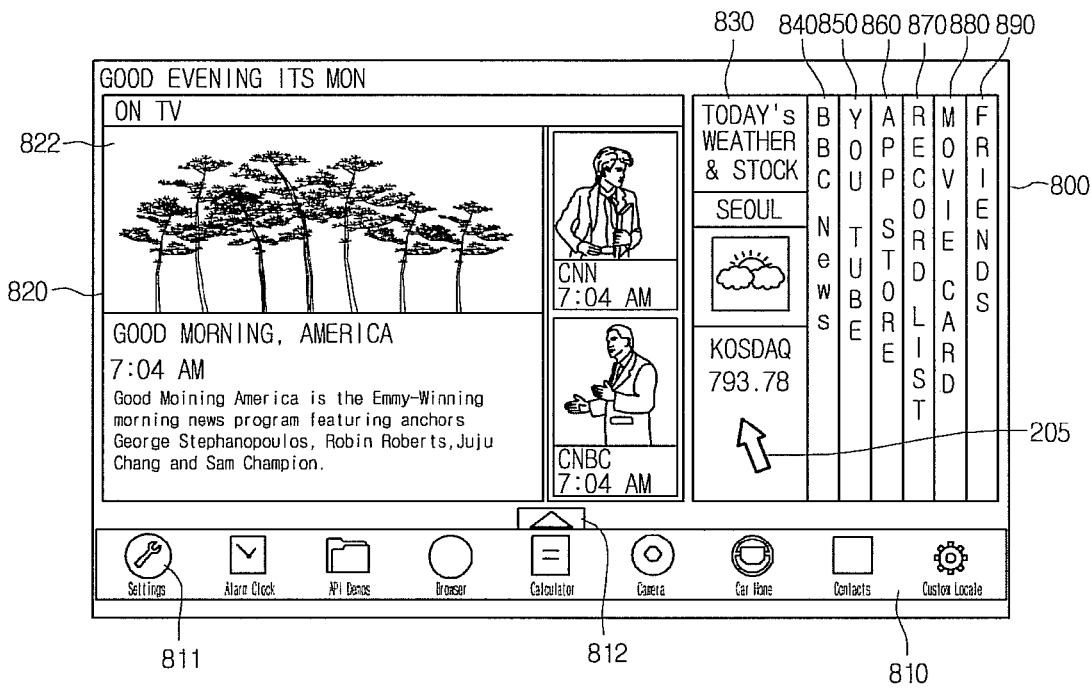

Referring to FIG. 18, if the user further drags the weather & stock information display window 830 in a left direction in the state shown in FIG. 17, two card objects 880 and 890 which had been not displayed before appear in the screen 800, so that all 7 card objects 830 to 890 selectable in the display device 100 may be displayed together on the screen 800, more particularly, on the first area 900 of the screen 800.

Figure 19:
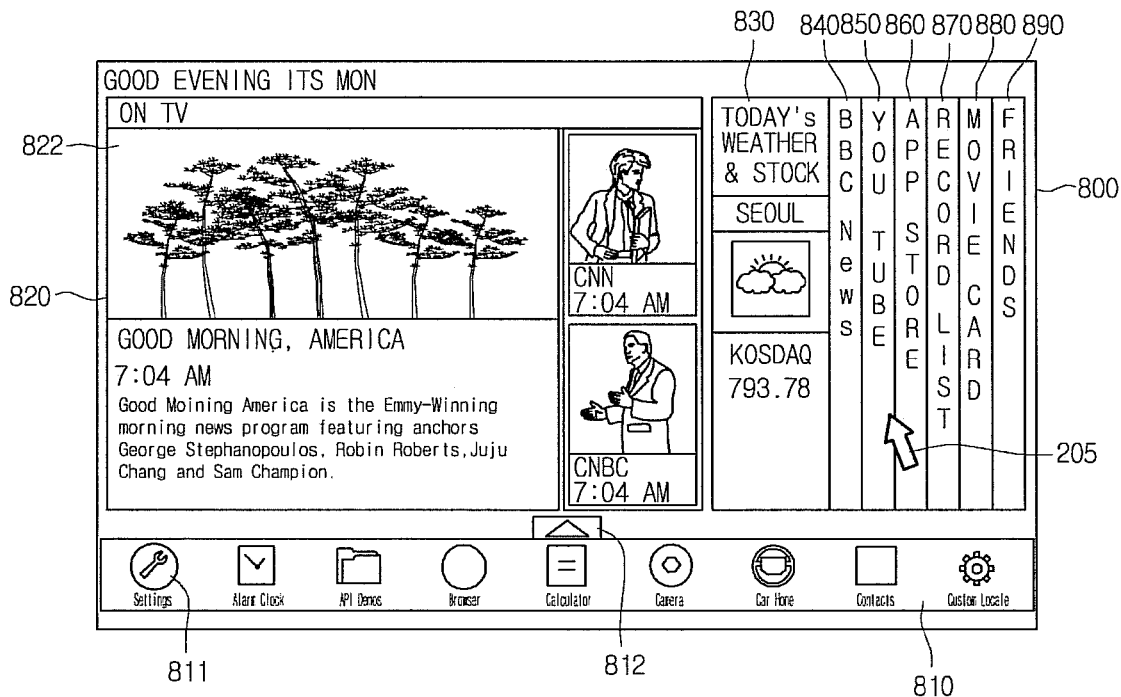
Figure 20:
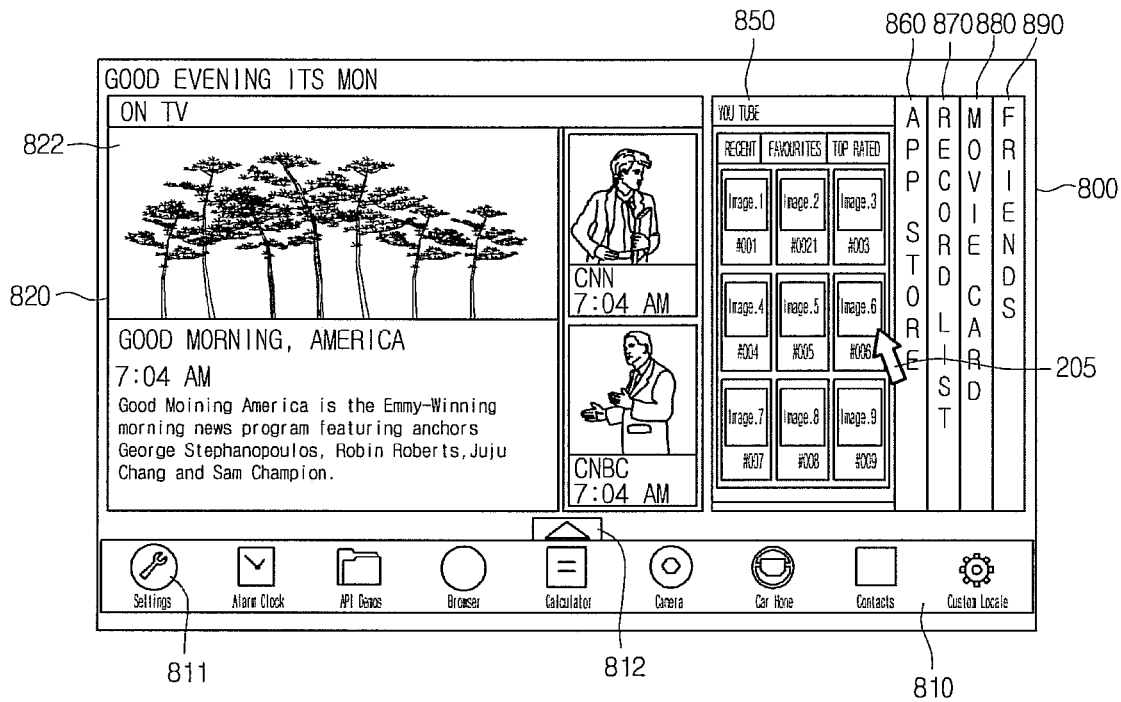

Meanwhile, if the user locates the pointer 205 on "YOU TUBE" object 850 as shown in FIG. 19, "YOU TUBE" object 850 on which the pointer 205 is located may be located is enlarged and displayed on the screen 800 as shown in FIG. 20.

Figure 21:
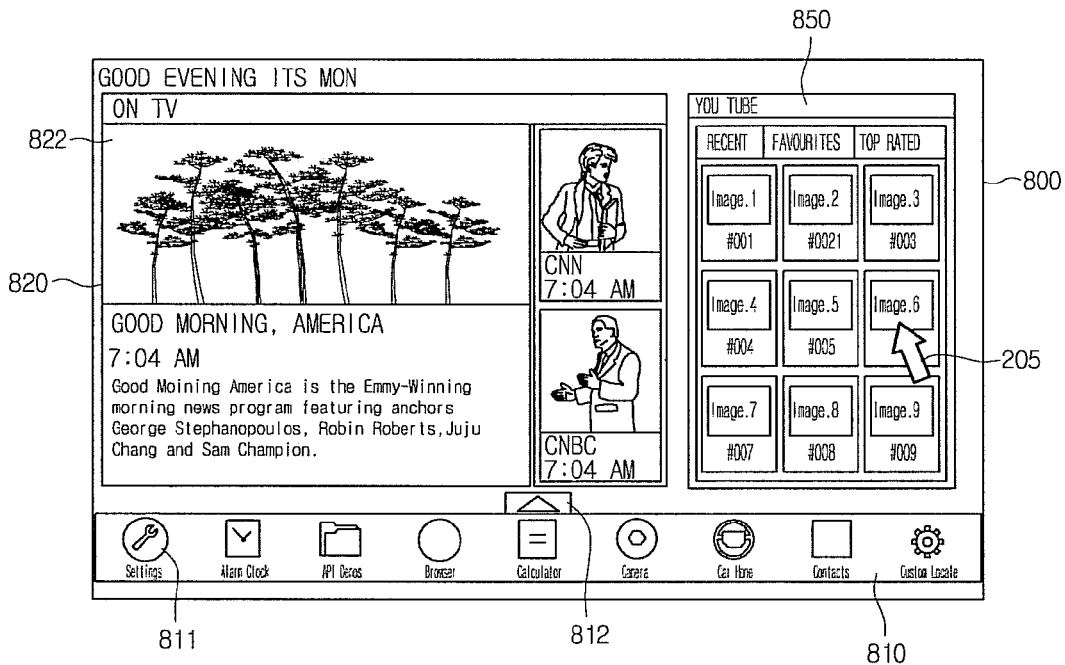

Furthermore, when the user selects "YOU TUBE" object 850 as shown in FIG. 21, the selected "YOU TUBE" object 850 may be displayed on the first area on which the weather & stock information display window 830 had been displayed.

Further, another embodiment of a method for displaying a plurality of card objects selectable in the display device on a screen is described below with reference to FIGS. 22 to 25.

Figure 22:
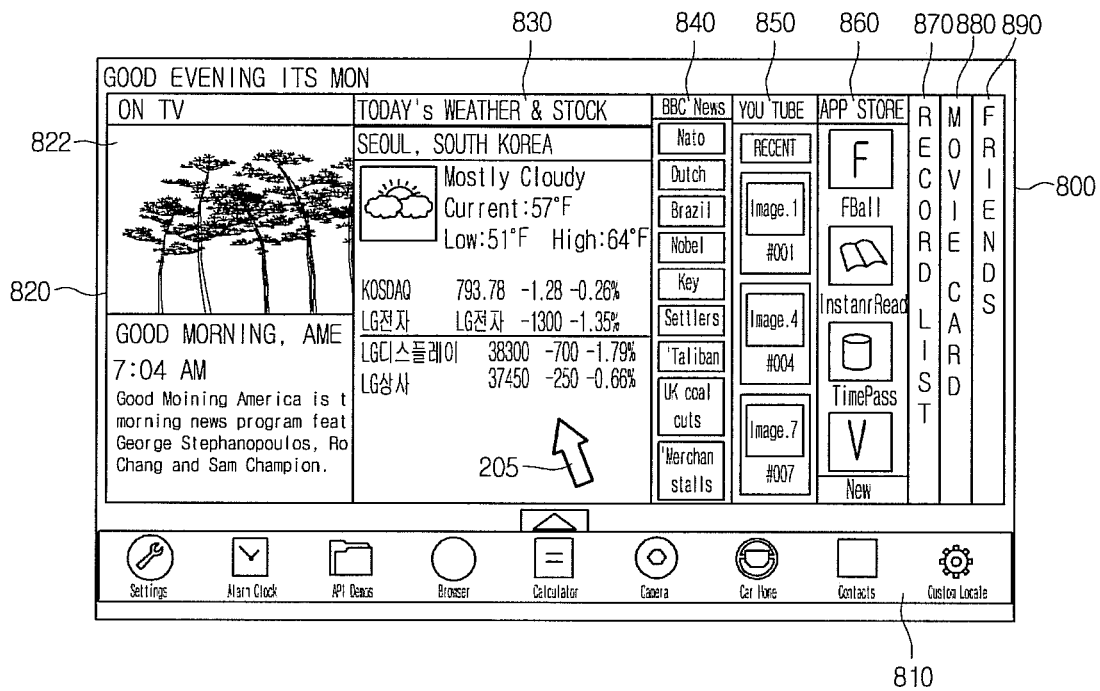
FIGS. 22 to 25 are diagrams showing a third embodiment of a method for displaying a plurality of card objects selectable in the display device on a screen.

Referring to FIG. 22, the user may drag the weather & stock information display window 830 into a location out of the first area of the screen 800, on which the weather & stock information display window 830 had been displayed, in a left direction.

In this case, the size of the dragged weather & stock information display window 830 may not be modified and the broadcasting display window 820 that is the object including the broadcasting video 822 may be covered by the weather & stock information display window 830.

Meanwhile, the other card objects 840 to 870 may be displayed to be adjacent to the weather & stock information display window 830, which is dragged in the left direction, in a right direction opposite to the drag direction.

Furthermore, as shown in FIG. 22, the card objects 840 to 870 displayed to be adjacent to the weather & stock information display window 830 in the right direction may have different sizes.

For example, "BBC News" object 840 may be displayed in a size larger than that of "RECORD LIST" object 870. Accordingly, the "BBC News" object 840 includes information about contents and the card object name of the "RECORD LIST" object 870 is only displayed on the screen 800.

Figure 23:
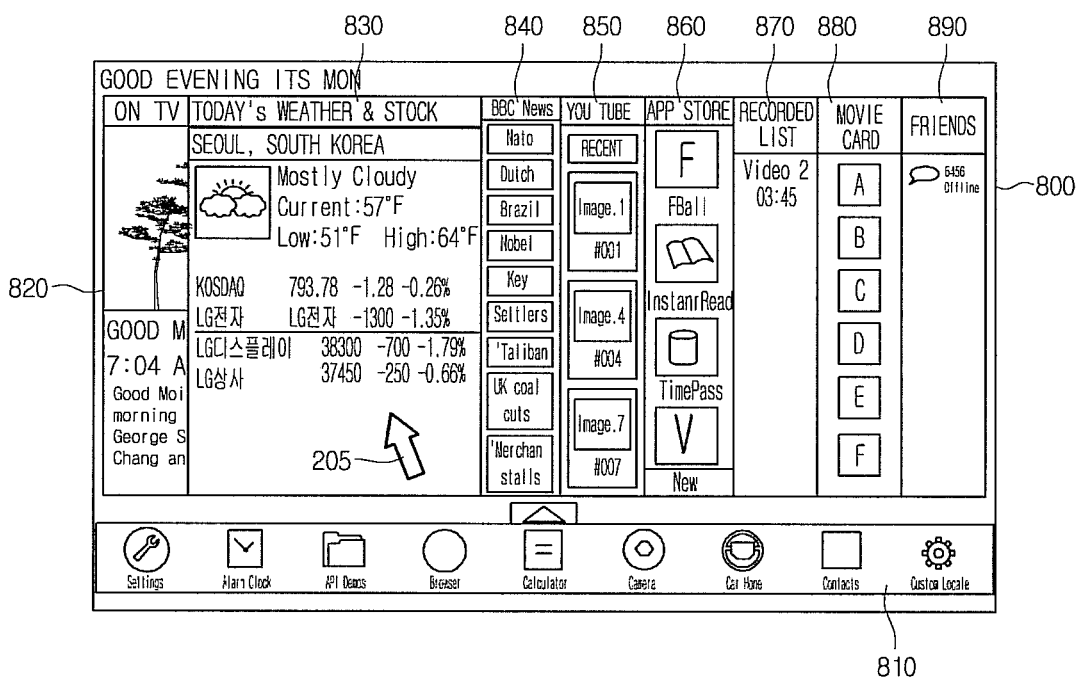

Referring to FIG. 23, when the user further drags the weather & stock information display window 830 in the left direction in the state shown in FIG. 22, the card objects 840 to 870 may be displayed on the screen 800 in the same size.

Meanwhile, the user selects a desired card object on the screen 800 shown in FIGS. 22 and 23 to cause the card object to be displayed on the first area of the screen 800 on which the weather & stock information display window 830 had been displayed.

Figure 24:
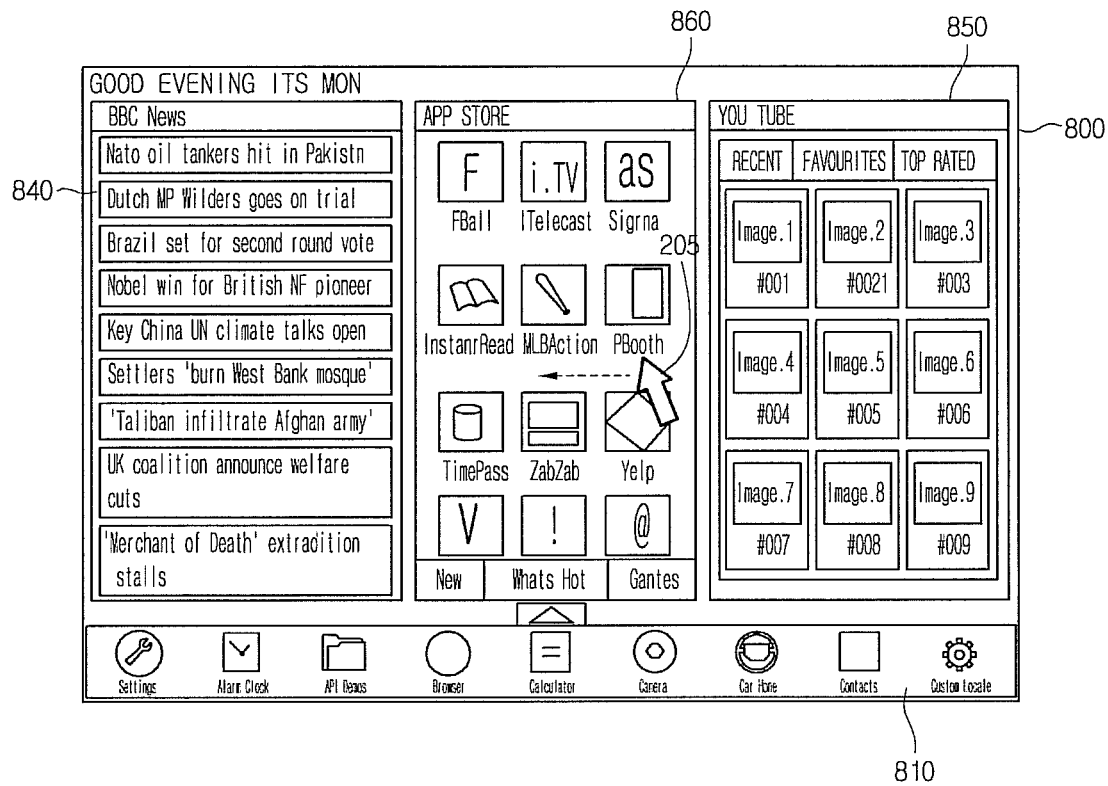

Referring to FIG. 24, the plurality of card objects 840, 850 and 860 may be displayed on the home screen 800 of the display device 100, and as the user drags a specific card object, the rest card objects 870, 880, 890, 830 selectable in the display device 100 may be displayed on the screen 800.

Figure 25:
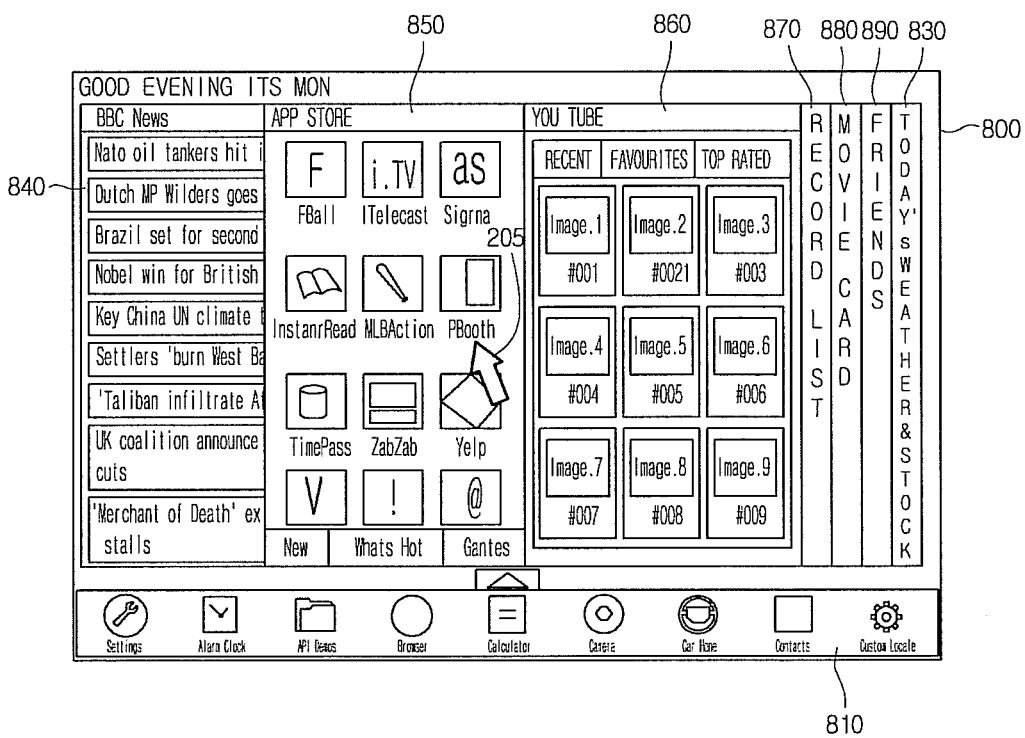

Referring to FIG. 25, when the user drags "APP STORE" object 860 displayed on the screen 800 in the left direction, the "YOU TUBE" object 850 adjacent to "APP STORE" object 860 in the right direction the is moved in the left direction along therewith, and the other card objects 870, 880, 890 and 830 are displayed to be adjacent to the "APP STORE" object 860 in the right direction.

The user selects a desired card object on the screen 800 shown in FIG. 25 to cause the selected card object to be displayed on the area on which the "APP STORE" object 860 had been displayed.

Further, another embodiment of a method for displaying a plurality of card objects selectable in the display device on a screen is described below with reference to FIGS. 26 to 35.

Figure 26:
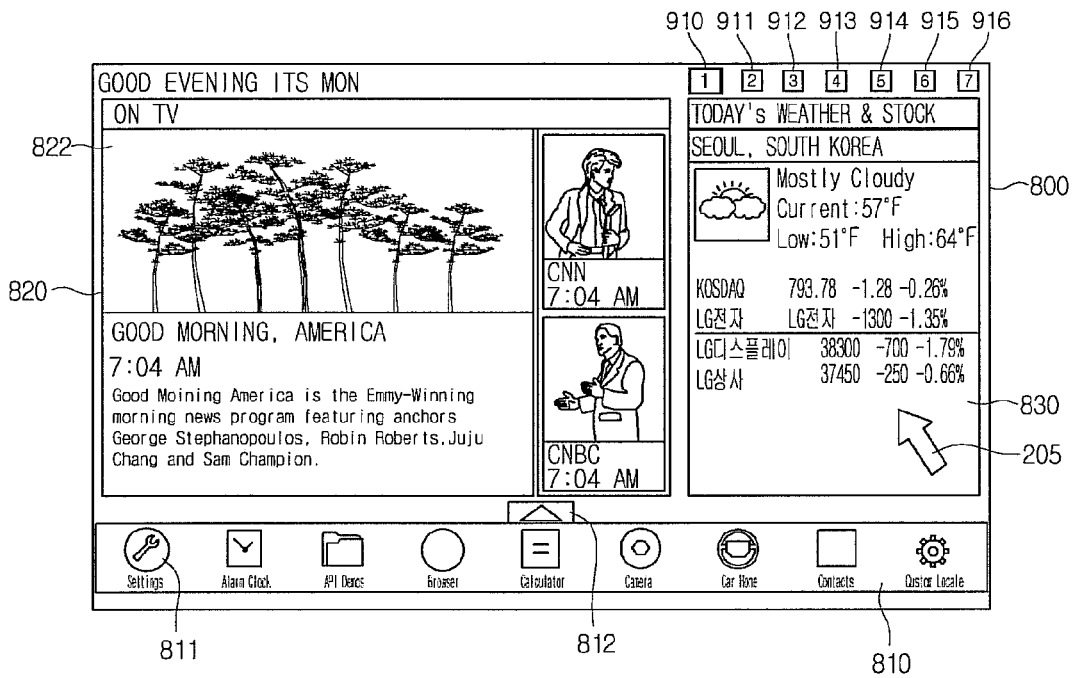
FIGS. 26 to 35 are diagrams showing a fourth embodiment of a method for displaying a plurality of card objects selectable in the display device on a screen.

Referring to FIG. 26, a plurality of icons 910 to 916 respectively representing a plurality of card objects may be displayed on the screen 800 of the display device 100.

For example, a first icon 910 corresponds to the weather & stock information display window 830, second to seventh icons 911 to 916 may respectively correspond to "BBC News" object 840, "YOU TUBE" object 850, "APP STORE" object 860, "RECORD LIST" object 870, "MOVIE CARD" object 880 and "FRIENDS" object 890 as shown in FIG. 12.

Meanwhile, as shown in FIG. 26, the icons 910 and 916 are designated by numbers, so that an icon and a card object corresponding to the corresponding icon can be identified.

The icon corresponding to the card object displayed on the current screen 800 is displayed in the size, shape or color different from those of other icons, thereby being discriminated from other icons.

For example, the first icon 910 corresponding to the weather & stock information display window 830 displayed in the screen 800 among icons 910 to 916 is highlighted or is displayed in a size larger than other icons 911 to 916 to represent the card object currently displayed.

Furthermore, when the user locates the pointer 205 on any one of the icons 901 to 916 displayed on the screen 800, information about the card object corresponding to the icon on which the pointer 205 is located may be displayed on the screen 800.

Figure 27:
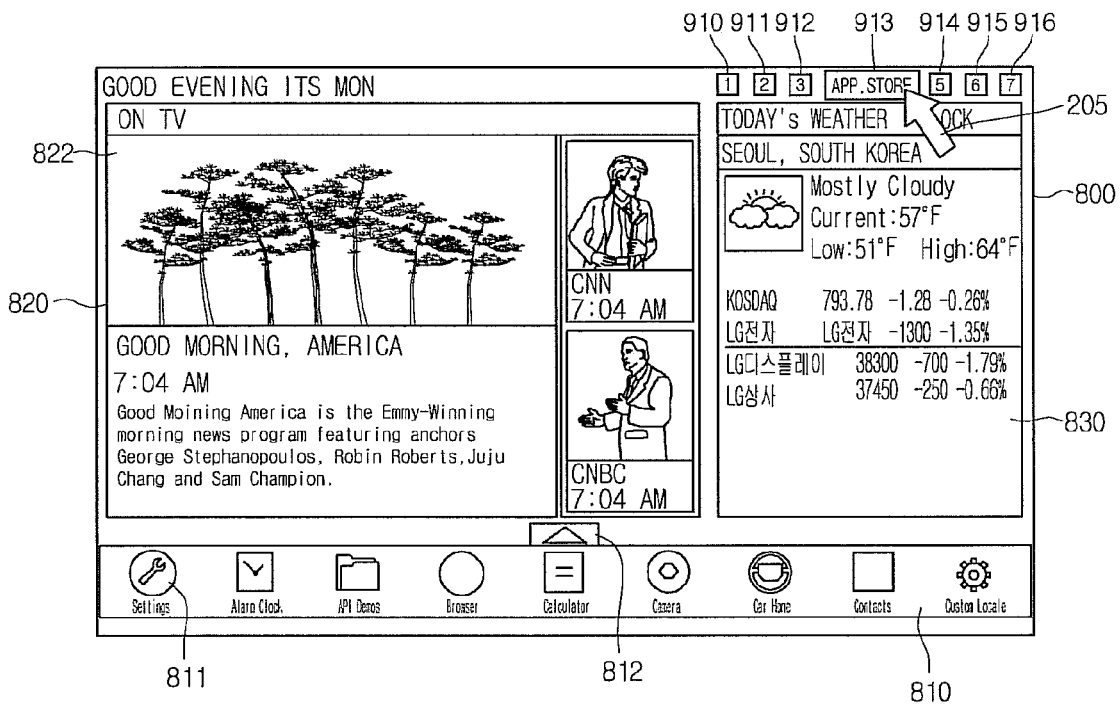

Referring to FIG. 27, when the pointer 205 is located on the fourth icon 913, information about the "APP STORE" object 860 corresponding to the fourth icon 913, for example, the name of the object "APP STORE" may be displayed on the fourth icon 913, and for this, the size of the fourth icon 913 may be increased.

Meanwhile, when the user selects any one of the icons 910 to 916 displayed on the screen 800, the card object corresponding to the selected icon is displayed on the screen 800.

Figure 28:
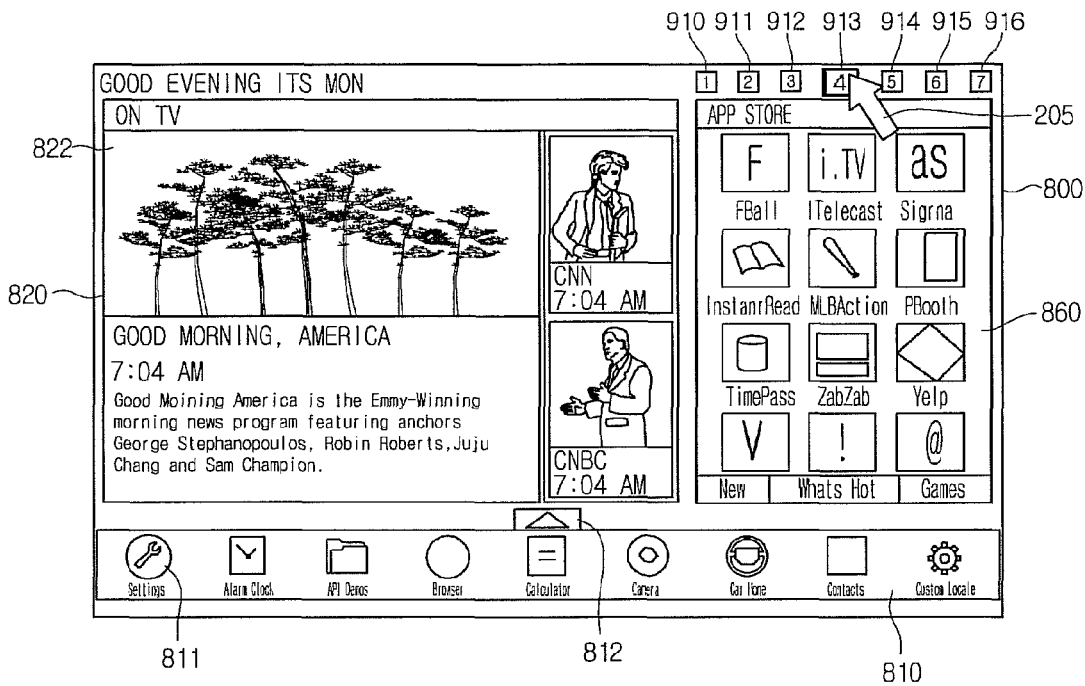

Referring to FIG. 28, when the user selects the fourth icon 913, the "APP STORE" object 860 corresponding to the fourth icon 913 may be displayed on the screen 800.

According to an embodiment of the present invention, the plurality of card objects selectable in the display device 100 may be edited using the icons 910 to 916 as described above.

Figure 29:
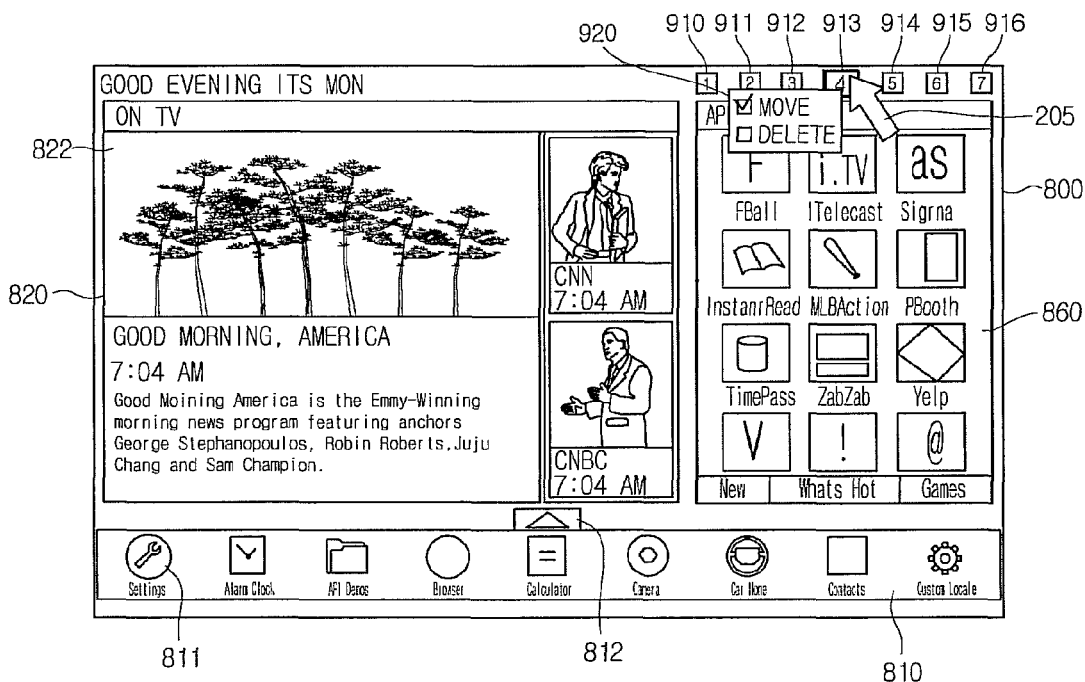

Referring to FIG. 29, in the state where the user locates the pointer 205 on the fourth icon 913, when a "edit" button displayed on the screen 800 or included in the remote control device 200 is selected, edit functions, such as MOVE, DELETE or the like, executable with respect to the "APP STORE" object 860 corresponding to the fourth icon 913 may be provided.

For example, as shown in FIG. 29, a edit option window 920 is displayed on the screen 800. The user can select "MOVE" or "DELETE" included in the edit option window 920 using the pointer 205.

Figure 30:
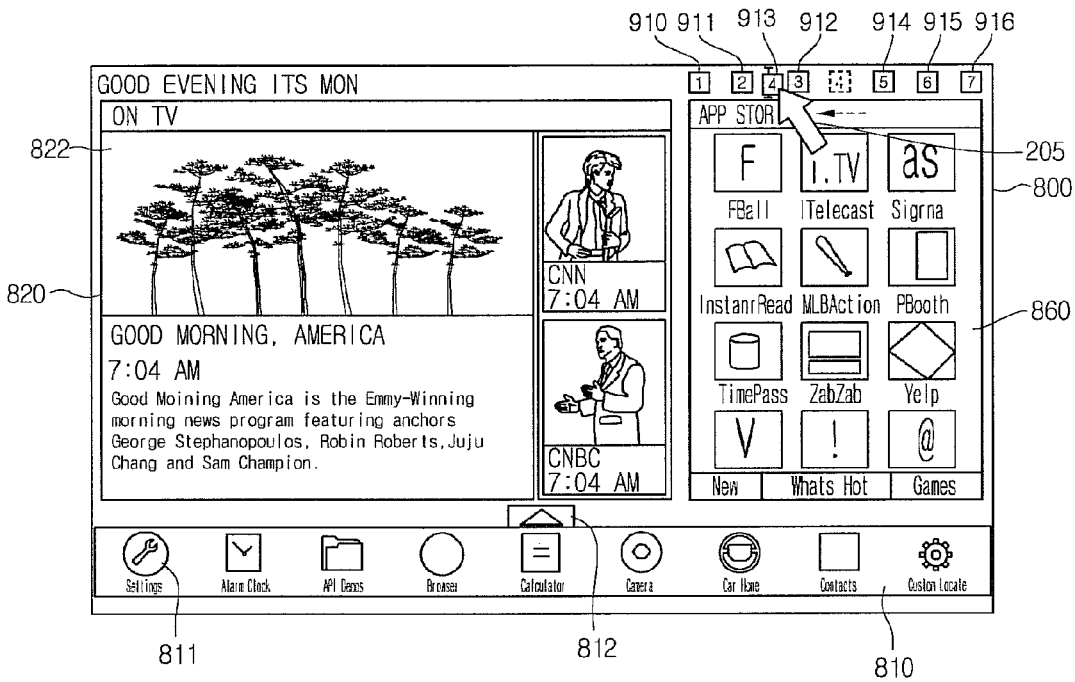

Referring to FIG. 30, when the user selects "MOVE" in the edit option window 920, the user can move the pointer 205 to drag the fourth icon 913 in a desired direction and drop the dragged fourth icon 913 on a desired location to move the "APP STORE" object 960 which is the corresponding card object into the desired location.

That is, when the user drags the fourth icon 913 and drops it between the second icon 911 and the third icon 912, the location of the "APP STORE" object 860 is moved into a location between the "BBC News" object 840 corresponding to the second icon 911 and the "YOU TUBE" object 850 corresponding to the third icon 912.

Figure 31:
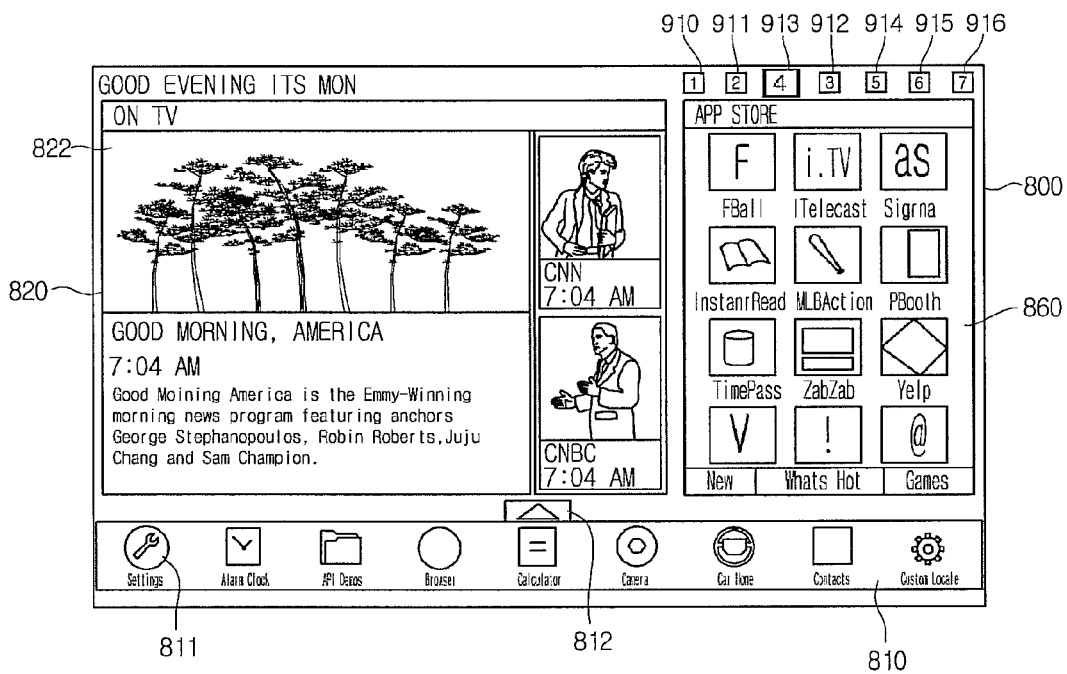

Referring to FIG. 31, according to the movement of the "APP STORE" object 860 as described above, the location of the fourth icon 913 is also moved into between the second icon 911 and the third icon 912.

Figure 32:
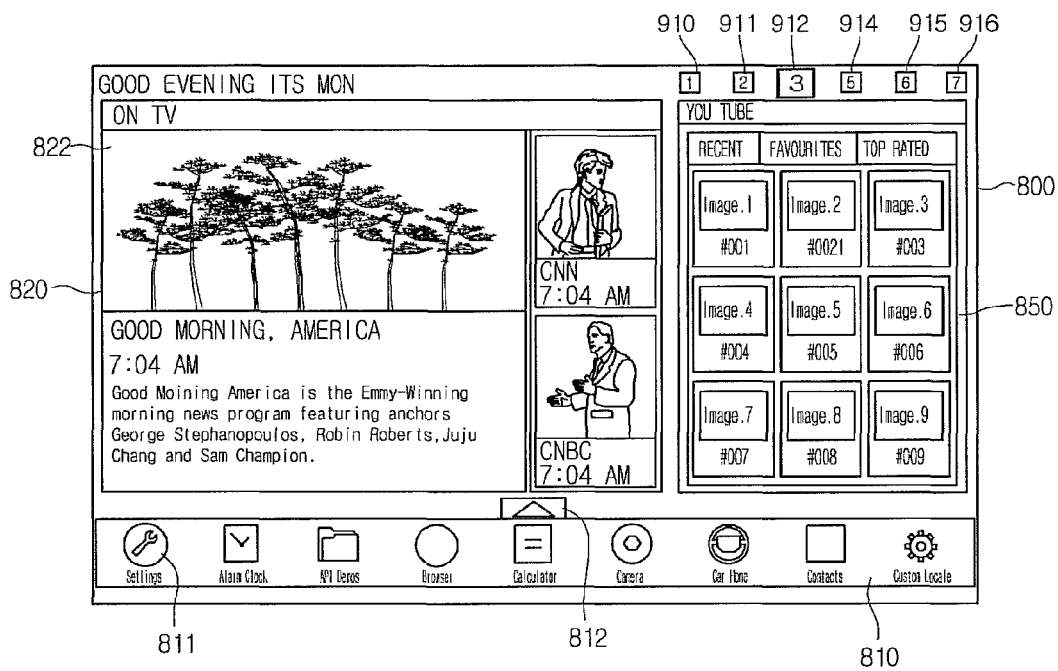

Referring to FIG. 32, when the user selects "DELETE" from the edit option window 920, the fourth icon 913 is not displayed on the screen 800 any more, and the "APP STORE" object 860 corresponding to the fourth icon 913 could be also deleted.

Meanwhile, the user performs edit functions, such as the movement, deletion or the like of icons as described above using up, down, left and right directional keys or number keys included in the remote control device 200.

Although the embodiments of the present invention are described under the example that the icons 910 to 916 representing the plurality of card objects selectable in the display device 100 are designated by number, the present invention it not limited thereto, and the icons 910 to 916 or the card objects may be designated by various characters, numbers or images to be discriminated from each other.

Figure 33:
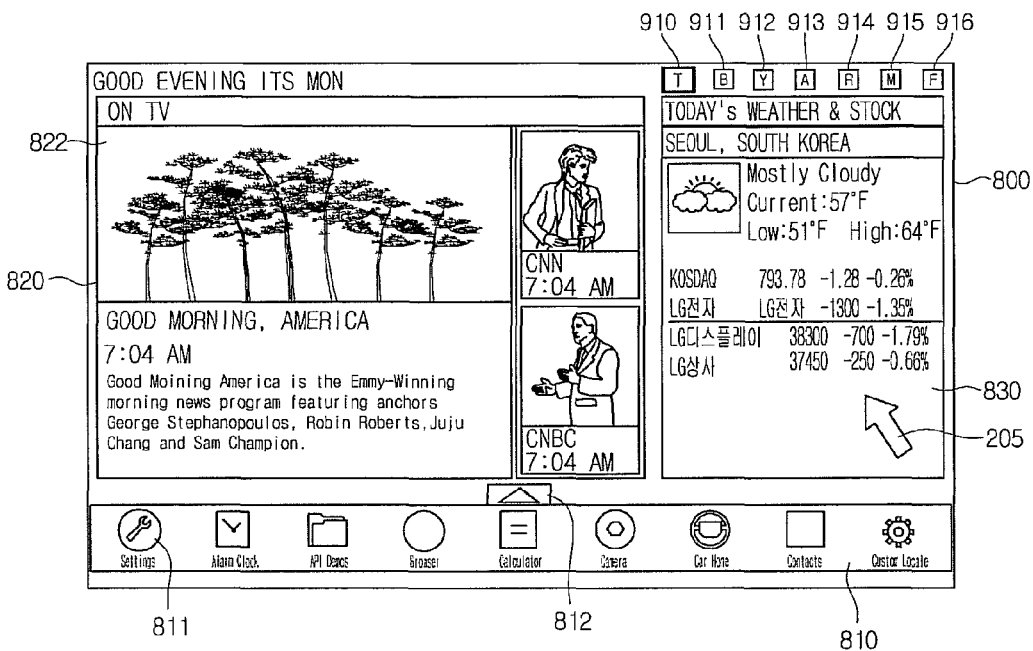

Referring to FIG. 33, in order to easily discriminate card objects from each other, the icons 910 to 916 may be designated by the first characters of alphabets representing respective card object names.

Meanwhile, the user selects two or more of the icons 910 to 916 displayed on the screen 800 to cause the plurality of card objects corresponding to the selected icons to be displayed on the screen 800.

Figure 34:
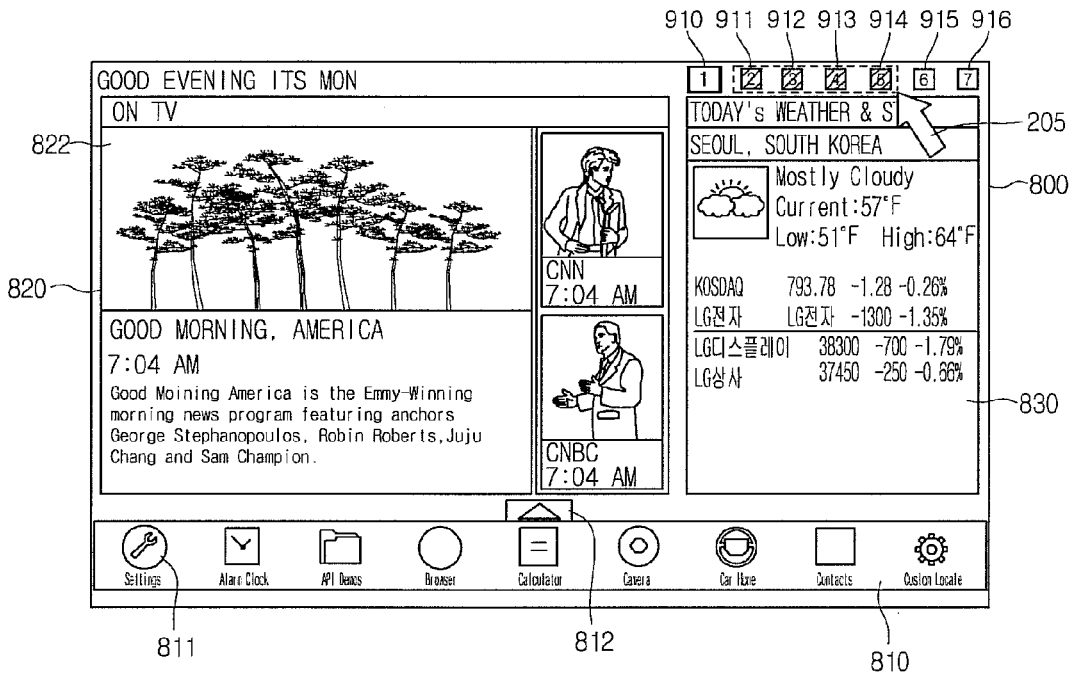

Referring to FIG. 34, the user may select the second to fifth icons 911 to 914 displayed on the screen 800 at one time by moving the pointer 205.

For example, when the user moves the pointer 205 in the state where a button included in the remote control device 200 has been selected, the designation of an area as shown in FIG. 34 is possible and the plurality of icons located within the designated area are selected together at one time.

In this case, the plurality of card objects corresponding to the selected plurality of icons may be displayed simultaneously on the screen 800.

Figure 35:
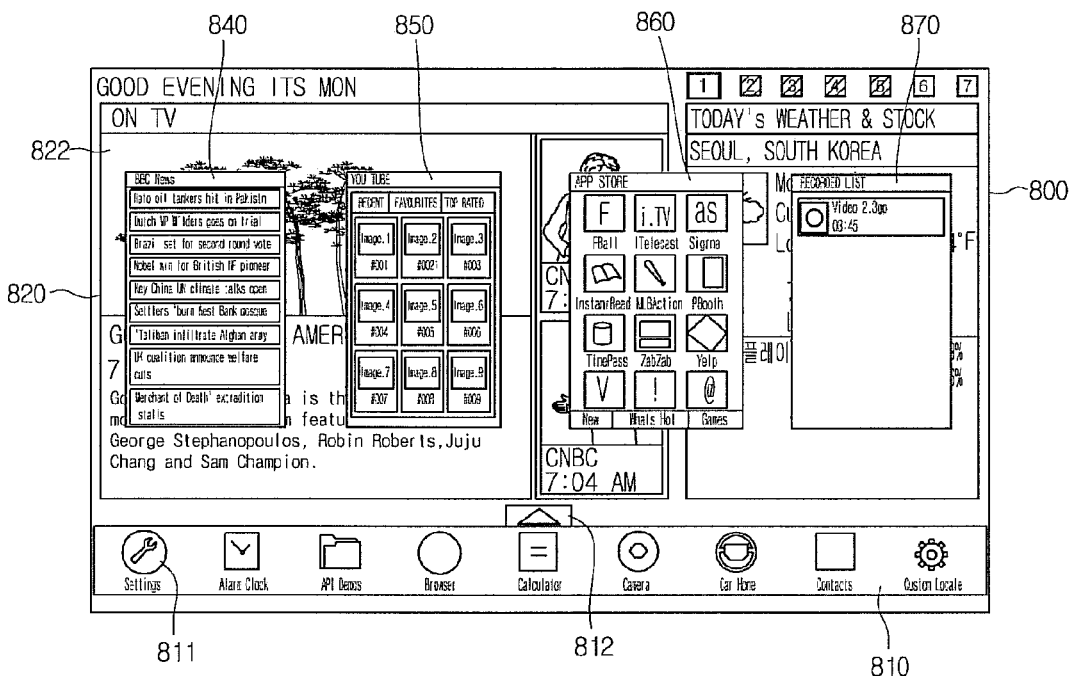

Referring to FIG. 35, when the user selects the second to fifth icons 911 to 914 together, the "BBC News" object 840, the "YOU TUBE" object 850, the "APP STORE" object 860 and the "RECORD LIST" object 870 respectively corresponding to the second to fifth icons 911 to 914 may be displayed on the screen 800.

Further, another embodiment of a method for displaying a plurality of card objects selectable in the display device on a screen is described below with reference to FIGS. 36 to 38.

Figure 36:
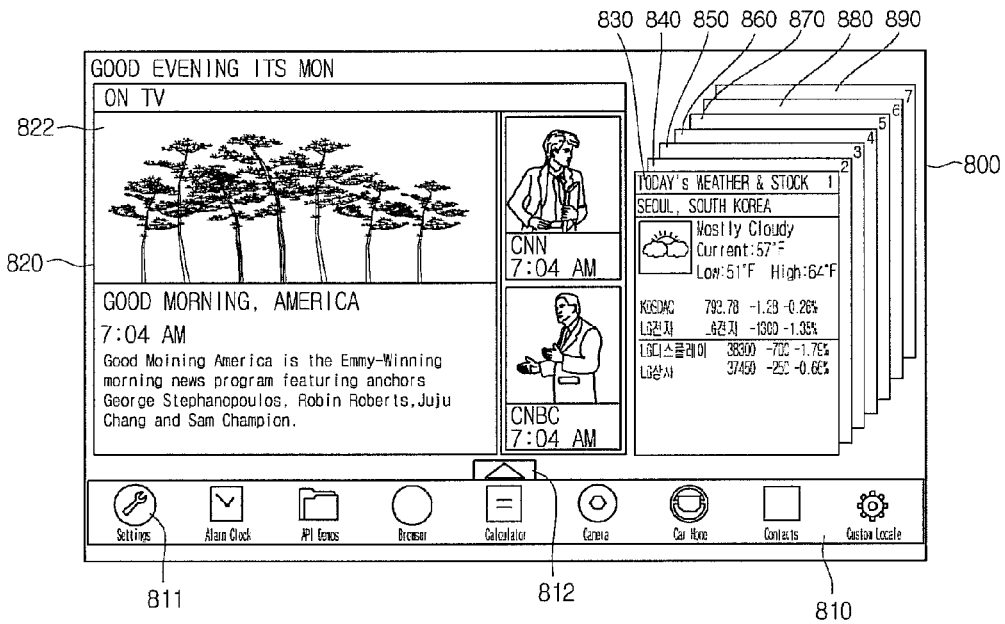
FIGS. 36 to 38 are diagrams showing a fifth embodiment of a method for displaying a plurality of card objects selectable in the display device on a screen.

Referring to FIG. 36, when the user requests the editing of the card objects, for example when the user locates the pointer on the card object displayed on the screen 800 and then selects the "edit" button included in the remote control device 200, partial areas of the rest card objects 840 to 890 except the weather & stock information display window 830 may be displayed on the screen 800.

Meanwhile, the rest card objects may be the "BBC News" object 840, the "YOU TUBE" object 850, the "APP STORE" object 860, the "RECORD LIST" object 870, the "MOVIE CARD" object 880 and the "FRIENDS" object 890 as shown in FIG. 12, and may be designated by numbers so as to be discriminated from each other.

Meanwhile, when the user locates the pointer on the card objects 840 to 890 displayed on the screen, the corresponding card objects may be displayed in the size, shape or color different from those of other card objects to be discriminated therefrom.

Figure 37:
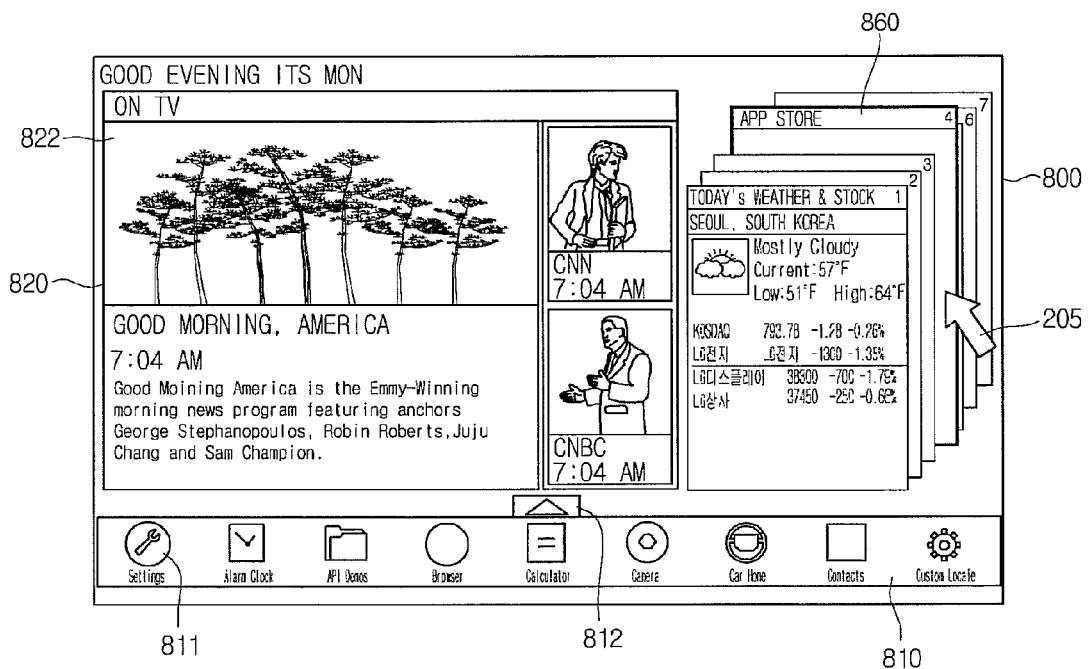

Referring to FIG. 37, when the user locates the pointer 205 on the "APP STORE" object 860, the "APP STORE" object 860 is enlarged in its size and displayed and at the same time, its card object name "APP STORE" may be displayed.

Figure 38:
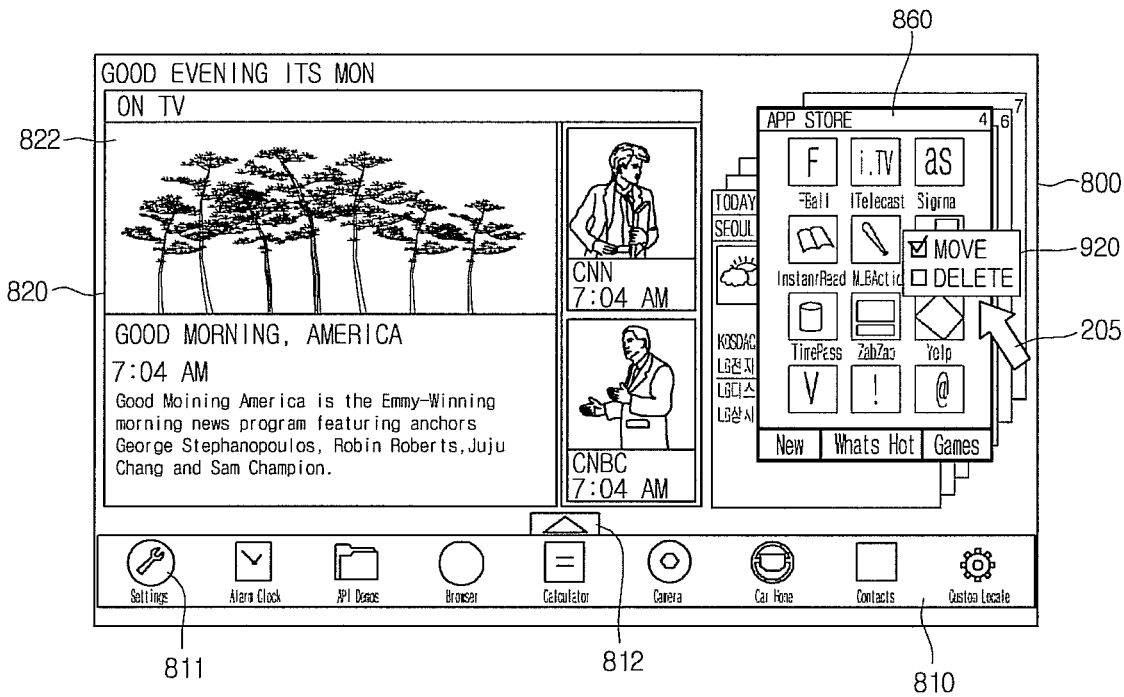

Meanwhile, as shown in FIG. 38, when the user locates the pointer 205 on the "APP STORE" object 860, the "APP STORE" object 860 is enlarged in its size and, at the same time, displayed in front of the other card objects 830 and 850 to 890, thereby causing the entire thereof to be displayed on the screen 800.

According to an embodiment of the present invention, when the user selects the "edit" button displayed on the screen 800 or included in the remote control device 200 in the state in which the pointer 205 has been located on the "APP STORE" object 860, the edit option window 920 may be displayed.

In this case, the user can move the location of the corresponding card object, for example, the "APP STORE" object 860 or delete it by selecting "MOVE" or "DELETE" included in the edit option window 920 using the pointer 205.

Meanwhile, the user can move or delete the card objects as described above using up, down, left and right directional keys or number keys included in the remote control device 200.

Furthermore, when a bookmark list or an application list representing websites or applications previously registered by a user is displayed, the method for controlling screen display according to the embodiments of the present invention as described above may be applicable.

For example, when the number of websites registered by the user exceeds the maximum number of websites which can be displayed on the bookmark, the display device 100 may control its screen so as to display all bookmarked websites.

Figure 39:
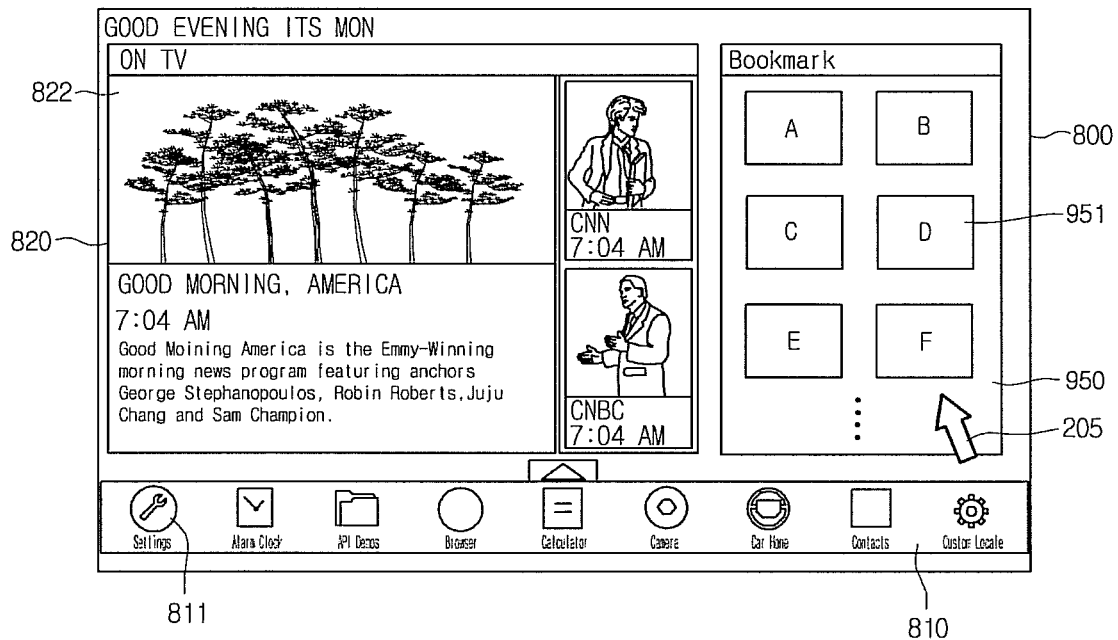
FIGS. 39 and 40 are diagrams showing an embodiment of a method for displaying a plurality of bookmarks on a screen.
Figure 40:
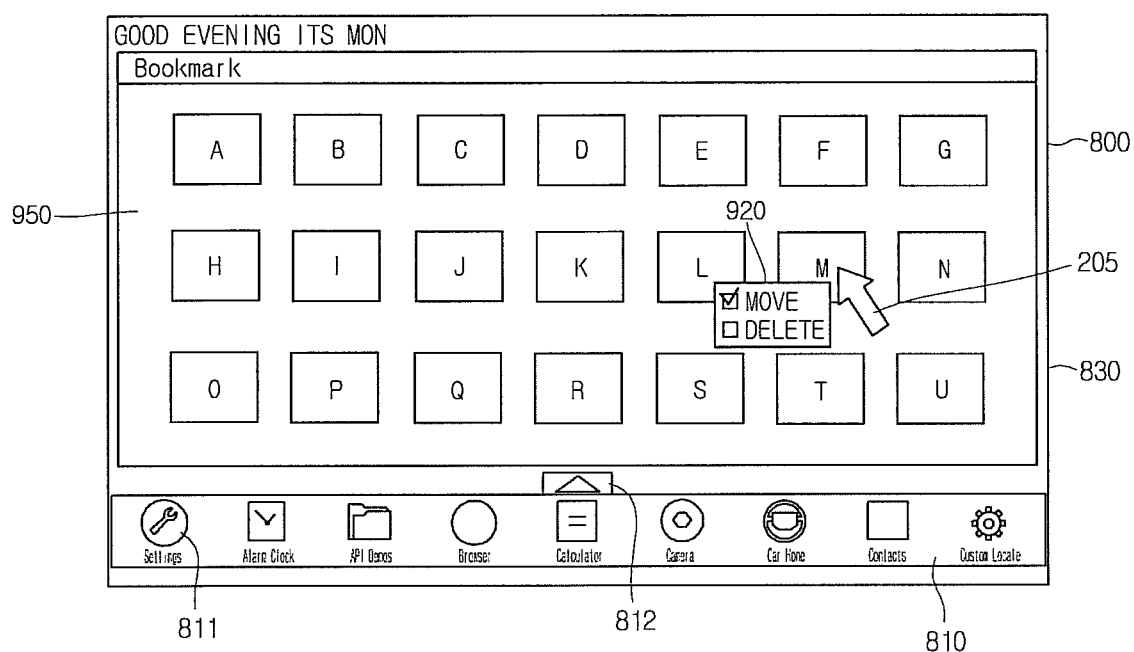

FIGS. 39 and 40 are diagrams for explanation of an embodiment of a method for displaying a plurality of bookmarks on a screen.

Referring to FIG. 39, "Bookmark" object 950 representing the bookmarks may be displayed on the whole or partial area of the screen 800, and the "Bookmark" object 950 may includes thumbnail images 951 respectively corresponding to the websites previously registered by the user.

Meanwhile, as shown in FIG. 39, when the number of websites previously registered by the user exceeds the maximum number of thumbnail images which can be displayed on the "Bookmark" object 950, some of all bookmarked websites may be only displayed on the screen 800.

When the user requests the editing of the "Bookmark" object 950, for example, when the pointer is located on the "Bookmark" object 950 and then the "edit" button included in the remote control device 200 is selected, the thumbnail images corresponding to all websites registered by the user may be displayed on the screen 800.

Referring to FIG. 40, the "Bookmark" object 950 is enlarged and displayed according to the editing request from the user, and 21 thumbnail images respectively corresponding to 21 websites registered by the user may be all displayed within the "Bookmark" object 950.

According to an embodiment of the present invention, when the user selects the "edit" button displayed on the screen 800 or included in the remote control device 200 in the state in which the user locates the pointer 205 on a specific thumbnail, the edit option window 920 may be displayed.

In this case, the user can move the corresponding thumbnail image, or delete the corresponding thumbnail image and the website corresponding thereto from the bookmark by selecting "MOVE" or "DELETE" included in the edit option window 920 using the pointer 205.

Meanwhile, the user can move or delete the thumbnail images as described above using up, down, left and right directional keys or number keys included in the remote control device 200.

According to the embodiments of the present invention, a plurality of card objects selectable in the display device are displayed on a screen so as to be easily identified by a user, thereby facilitating the selection and modification of the objects and therefore improving the convenience of the user.

The method for controlling screen display in the display device according to the present invention can also be embodied as programs to be executable in a computer and be stored in a computer readable recording media. Examples of the computer readable recording media include read-only memory (ROM), random-access memory (RAM), CD-ROMs, magnetic tapes, floppy disks, optical data storage devices, and so on. Furthermore, it can be implemented as carrier waves (such as data transmission through the Internet).

Further, the computer-readable recording media are distributed on computer systems connected through the network, and thus the computer-readable recording media may be stored and executed as the computer-readable code by a distribution scheme. Further, functional programs, codes, and code segments for implementing a method of receiving broadcast can be easily inferred by programmers in the related art.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

What is claimed is:

1. A method for controlling screen display in a display device, comprising:
    displaying a first card object including at least one content on a first area of a screen;
    arranging a plurality of card objects in a prescribed order in a virtual hidden area adjacent to the screen;
    in response to a first request, moving a subsequent card object from the virtual hidden area to the first area based on the prescribed order and moving the first card object to the virtual hidden area;
    in response to a second request, reducing a size of the first card object and reducing a size of the plurality of card objects in the virtual hidden area and displaying both the first card object and the plurality of card objects on the screen, the reduced sizes of the first card object and the plurality of card objects being the same size;
    receiving selection of at least one of the card objects; and
    displaying the selected card object on the first area of the screen,
    wherein the displayed plurality of card objects are divided according to sources of the contents included in the corresponding card objects, and
    wherein the second request for the card objects includes an operation of dragging the first card object in a first direction.

2. The method of claim 1, wherein the displayed card objects are all card objects displayable in the display device.

3. The method of claim 2, wherein the reducing the size and displaying the card objects scales down the plurality of card objects to have sizes to be simultaneously displayed on the screen and displays them when the first card object is selected.

4. The method of claim 1, further comprising, when a pointer is located on any one of the plurality of card objects, enlarging and displaying the card object on which the pointer is located in a size larger than those of other card objects.

5. The method of claim 1, wherein the second request for the card objects includes an operation of selecting a specific button displayed on the screen or included in the remote control device.

6. The method of claim 1, wherein the reducing the size and displaying the card objects displays second card objects to be adjacent to the first card object in a direction opposite to the first direction.

7. The method of claim 6, wherein object names respectively corresponding to the second card objects are displayed to be adjacent to the first card object.

8. The method of claim 7, further comprising enlarging and displaying the card object on which the pointer is located such that contents included therein appear when the pointer is located on any one of the second card objects.

9. The method of claim 6, wherein the plurality of card objects is displayed within the first area of the screen.

10. The method of claim 1, further comprising terminating display of the first and second card objects and again displaying the first card object on the first area when the card object to be modified and displayed is not selected for a predetermined time after the dragging operation.

11. The method of claim 1, wherein a number of the scaled-down and displayed card objects is altered according to any one of a distance or velocity at which the first card object is dragged.

12. The method of claim 1, wherein the plurality of card objects include at least one of a broadcasting video, a content provider list, a buyable application list, a broadcasting channel list, a broadcasting guide list, a broadcasting reservation/recording list, a media list, an external device list, a voice communication related list, and a list of contents provided by a specific content provider.

13. A non-transitory computer-readable recording media recorded with programs for causing a computer to perform the method according to claim 1.

14. A method for controlling screen display in a display device, comprising:
    displaying a first card object including at least one content on a first area of a screen;
    arranging a plurality of card objects in a prescribed order in a virtual hidden area adjacent to the screen;

in response to a first request, moving a subsequent card object from the virtual hidden area to the first area based on the prescribed order and moving the first card object to the virtual hidden area;

in response to a second request, reducing a size of the first card object and reducing a size of the plurality of card objects in the virtual hidden area and displaying both the first card object and the plurality of card objects on the screen, the reduced sizes of the first card object and the plurality of card objects being the same size;

receiving selection of at least one of the card objects; and displaying the selected card object on the first area of the screen, wherein the displayed plurality of card objects are divided according to sources of the contents included in the corresponding card objects, and wherein the second request for the card objects includes an operation of selecting a specific area of the first card object.

15. A display device comprising:

a display for displaying a first card object including at least one content on a first area of a screen;

a user interface for receiving a request on at least one card object displayed on the screen; and a controller for controlling the display of card objects, wherein a plurality of card objects are arranged in a prescribed order in a virtual hidden area adjacent to the screen, in response to a first request, a subsequent card object is moved from the virtual hidden area to the first area based on the prescribed order and moving the first card object to the virtual hidden area, in response to a second request, a size of the first card object is reduced and a size of the plurality of card objects in the virtual hidden area are reduced and both the first card object and the plurality of card objects are displayed on the screen, the reduced sizes of the first card object and the plurality of card objects being the same size, a selection of at least one of the card objects is received, and the selected card object is displayed on the first area of the screen, wherein the displayed plurality of card objects are divided according to sources of the contents included in the corresponding card objects, and wherein the second request for the card objects includes an operation of dragging the first card object in a first direction.

16. The display device of claim 15, wherein the display enlarges and displays, when a pointer is located on any one of the plurality of card objects, the card object on which the pointer is located in a size larger than those of other card objects.

17. The display device of claim 15, wherein the display terminates reduction and display of the card objects and again displays the first card object on the first area when the card object to be displayed on the first area is not selected for a predetermined time after the plurality of card objects have been scaled down and displayed.

18. The display device of claim 15, wherein the display displays, when the first card object is dragged in a first direction, second card objects to be adjacent to the first card object in a direction opposite to the first direction.

19. The display device of claim 18, wherein a number of the reduced size card objects is altered according to any one of a distance or velocity at which the first card object is dragged.

20. A display device comprising:

a display for displaying a first card object including at least one content on a first area of a screen;

a user interface for receiving a request on at least one card object displayed on the screen; and a controller for controlling the display of card objects, wherein a plurality of card objects are arranged in a prescribed order in a virtual hidden area adjacent to the screen, in response to a first request, a subsequent card object is moved from the virtual hidden area to the first area based on the prescribed order and moving the first card object to the virtual hidden area, in response to a second request, a size of the first card object is reduced and a size of the plurality of card objects in the virtual hidden area are reduced and both the first card object and the plurality of card objects are displayed on the screen, the reduced sizes of the first card object and the plurality of card objects being the same size, a selection of at least one of the card objects is received, and the selected card object is displayed on the first area of the screen, wherein the displayed plurality of card objects are divided according to sources of the contents included in the corresponding card objects, and wherein the second request for the card objects includes an operation of selecting a specific area of the first card object.

* * * * *